(12) United States Patent
Chino

(10) Patent No.: US 11,106,160 B2
(45) Date of Patent: Aug. 31, 2021

(54) DRIVE TRANSMISSION DEVICE AND IMAGE FORMING APPARATUS INCLUDING THE DRIVE TRANSMISSION DEVICE

(71) Applicant: CANON KABUSHIKI KAISHA, Tokyo (JP)

(72) Inventor: Hideto Chino, Ashigarakami-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/919,529

(22) Filed: Jul. 2, 2020

(65) Prior Publication Data
US 2021/0003945 A1    Jan. 7, 2021

(30) Foreign Application Priority Data
Jul. 5, 2019 (JP) .............................. JP2019-125897

(51) Int. Cl.
G03G 15/00 (2006.01)
G03G 15/16 (2006.01)
F16H 27/08 (2006.01)

(52) U.S. Cl.
CPC ......... *G03G 15/1615* (2013.01); *F16H 27/08* (2013.01)

(58) Field of Classification Search
CPC .... G03G 15/00; G03G 15/0136; G03G 15/16; G03G 15/1615; G03G 15/757; G03G 21/1647; G03G 21/1857; G03G 2221/1657; F16H 27/08
USPC ....... 399/121, 159–165, 167, 297, 302, 303, 399/308, 312, 313
See application file for complete search history.

(56) References Cited

U.S. PATENT DOCUMENTS

| | | | | |
|---|---|---|---|---|
| 7,577,382 B2* | 8/2009 | Sato | .................. | G03G 21/1864 399/167 |
| 7,793,933 B2* | 9/2010 | Morimoto | ............ | G03G 15/602 271/264 |
| 8,036,567 B2* | 10/2011 | Hayakawa | ........... | G03G 15/161 399/101 |
| 8,150,296 B2* | 4/2012 | Sakurai | .............. | G03G 21/1647 399/227 |
| 8,322,703 B2* | 12/2012 | Miwa | ..................... | B65H 5/062 271/10.13 |
| 8,746,433 B2* | 6/2014 | Seki | ........................ | G07D 11/40 194/206 |
| 9,217,983 B2* | 12/2015 | Miki | .................... | G03G 21/1647 |
| 9,239,557 B2* | 1/2016 | Suzuki | ............... | G03G 15/2053 |
| 10,496,026 B2* | 12/2019 | Murasaki | ........... | G03G 15/2064 |

(Continued)

FOREIGN PATENT DOCUMENTS

JP    2017-89729 A    5/2017

*Primary Examiner* — Hoan H Tran
(74) *Attorney, Agent, or Firm* — Venable LLP

(57) ABSTRACT

A drive transmission device includes a driving gear, a follower gear, an intermediary gear, an output gear, and an elastic member. Transmission of a driving force from the driving gear to the follower gear and transmission of the driving force from the intermediary gear to the output gear are disabled, in a non-transmission state. In a transmission state, (i) the follower gear is moved by an elastic force of the elastic member to enable rotation of the follower gear by the driving force from the driving gear, and thereafter, (ii) the intermediary gear is rotated by the follower gear without rotating the output gear, and thereafter, the intermediary gear is enabled to transmit the driving force to the output gear.

18 Claims, 18 Drawing Sheets

(56) References Cited

U.S. PATENT DOCUMENTS

| | | |
|---|---|---|
| 10,704,610 B2 * | 7/2020 | Chino ................... F16D 23/12 |
| 2017/0131662 A1 | 5/2017 | Iwakoshi |
| 2017/0248211 A1 | 8/2017 | Chino .................. B65H 3/0669 |
| 2018/0195560 A1 | 7/2018 | Chino ................... F16D 13/16 |

* cited by examiner

DRIVE TRANSMISSION DEVICE AND IMAGE FORMING APPARATUS INCLUDING THE DRIVE TRANSMISSION DEVICE

FIELD OF THE INVENTION AND RELATED ART

The present invention relates to a drive transmission device provided in an image forming apparatus such as a copying machine or a printer.

Conventionally, in the image forming apparatus, in some instances, a constitution in which a driving force from a driving source is intermittently transmitted is employed. For example, a drive transmission device for intermittently driving a sheet feeding roller has been known (Japanese Laid-Open Patent Application (JP-A) 2017-089729). This drive transmission device includes a driving gear rotatable by a motor, a follower gear which is rotatable in engagement with the driving gear and which transmits a driving force (drive) to the sheet feeding roller, and a movable piece which includes a claw on one end side thereof and which is movable in a seesaw-like shape by a solenoid.

In the drive transmission device, the driving force is transmitted from the driving gear to the follower gear in engagement therebetween. On the other hand, the claw of the movable piece is engaged with a locking portion provided on the follower gear and thus the follower gear is stopped at a position where a toothless portion provided on the follower gear opposes the driving gear, so that the drive from the driving gear to the follower gear is eliminated. By such a constitution, the sheet feeding roller is intermittently driven.

In this drive transmission device, when the follower gear is rotated to a position, where the toothless portion thereof opposes the driving gear, for being stopped or when the stopped follower gear is rotated to a position where the follower gear engages with the driving gear again, the toothless portion of the follower gear opposes the driving gear. For this reason, it is difficult to rotate the follower gear by obtaining a rotational force from the driving gear. Therefore, the follower gear is rotated by an elastic force of a spring.

However, in the case where the follower gear is rotated, a drive transmission constitution in which all the members from the follower gear to the sheet feeding roller are always rotated is employed. Accordingly, the spring for rotating the follower gear is required to be capable of generating a relatively large rotational force to the extent that all the members from the follower gear to a driven member are rotated. That is, an elastic force of an elastic member has to be made large in proportion to a magnitude of a load torque on the driven member side which is destination of drive transmission.

Thus, in the case where the elastic force of the spring acting on the follower gear is large, an extensive spring or a large spring has to be used, so that there is a liability that the perspective view is increased in size and cost and is lowered in assembling property correspondingly. Further, a portion for supporting a tensile spring for the follower gear is also required to use a material and a shape such that the resultant portion can withstand a large elastic force of the spring, so that there is a liability that the device is increased in size and cost correspondingly.

Therefore, a constitution in which the elastic force of the spring for rotating the follower gear to a home position can be reduced irrespective of the load torque of the driven member has been proposed (JP-A 2017-089729). In this drive transmission device, the follower gear opposing the driving gear driven by the motor and rotatable in engagement with the driving gear is provided. Further, the drive transmission device includes an input gear rotatable in interrelation with the follower gear, an output gear opposing the input gear and a reverse rotation preventing lever, urged by a lever spring, for preventing reverse rotation of the output gear.

Drive of the driving gear is inputted to the follower gear and the input gear rotatable in interrelation with the follower gear engages with the output gear, so that the drive is transmitted. Incidentally, the follower gear is constituted so that the reverse rotation by engagement of the reverse rotation preventing lever urged by the lever spring with a portion-to-be-engaged provided on the follower gear can be prevented.

In this constitution, when the toothless portion of the follower gear opposes the driving gear, at a portion where the input gear and the output gear oppose each other, a non-contact portion where the input gear and the output gear do not contact each other is provided on either one of the input gear and the output gear, so that the input gear and the output gear are put in a non-contact state. By this, irrespective of the load torque of the driven member, the follower gear can be rotated to the home position, so that the elastic force of a torsion spring can be reduced.

However, the reverse rotation of the output gear was restricted by the reverse rotation preventing lever urged by the lever spring and therefore the number of component parts was increased. Further, the reverse rotation preventing lever was rotatable about a rotation shaft and was urged against the output gear by the lever spring comprising an elastic member, and therefore, there arose a problem such that an operation noise at the time when the reverse rotation preventing lever contacted the output gear generated.

SUMMARY OF THE INVENTION

The present invention has solved the above-described problem. A principal object of the present invention is to provide a drive transmission device capable of not only shutting off a reverse input torque from a driven member side irrespective of a rotational direction but also reducing the number of component parts and generation of an operation noise.

According to an aspect of the present invention, there is provided a drive transmission device comprising: a driving gear to which a driving force is inputted from a driving source; a follower gear rotatable by the driving gear; an intermediary gear rotatable by the follower gear; an output gear rotatable by the intermediary gear and configured to transmit the driving force to a driven member; and an elastic member configured to move the follower gear from a state in which the follower gear is not rotated by the driving gear to a state in which the follower gear is rotated by the driving gear, wherein transmission of the driving force from the driving gear to the follower gear and transmission of the driving force from the intermediary gear to the output gear are disabled, in a non-transmission state, and wherein in a transmission state, (i) the follower gear is moved by an elastic force of the elastic member to enable rotation of the follower gear by the driving force from the driving gear, and thereafter, (ii) the intermediary gear is rotated by the follower gear without rotating the output gear, and thereafter, the intermediary gear is enabled to transmit the driving force to the output gear.

Further features of the present invention will become apparent from the following description of exemplary embodiments with reference to the attached drawings.

Figure 2:
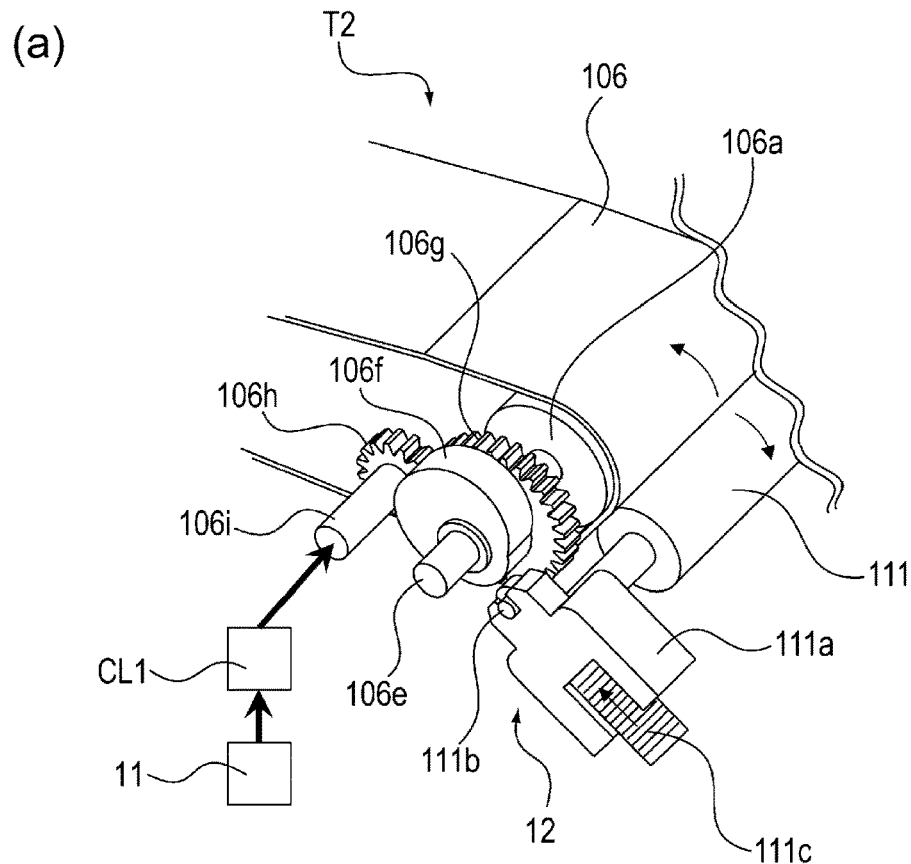
Figure 2:
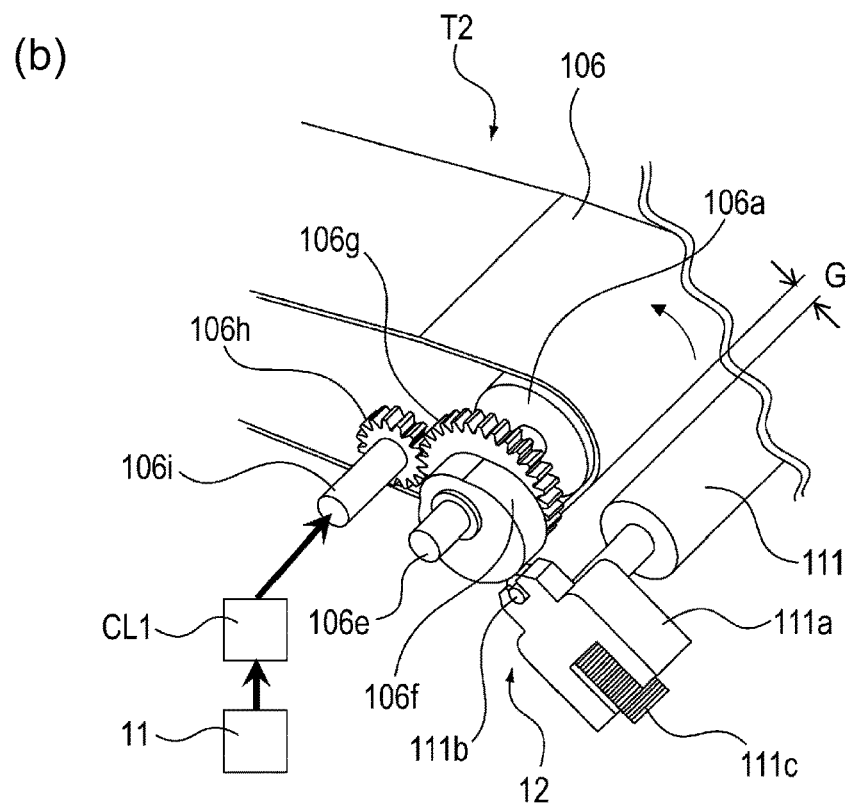

Part (a) of FIG. 2 is perspective view showing a structure of a secondary transfer portion in where a secondary transfer roller is contacted to a belt, and part (b) of FIG. 2 is a perspective view showing a structure of the secondary transfer portion where the secondary transfer roller is separated from the belt.

Figure 3:
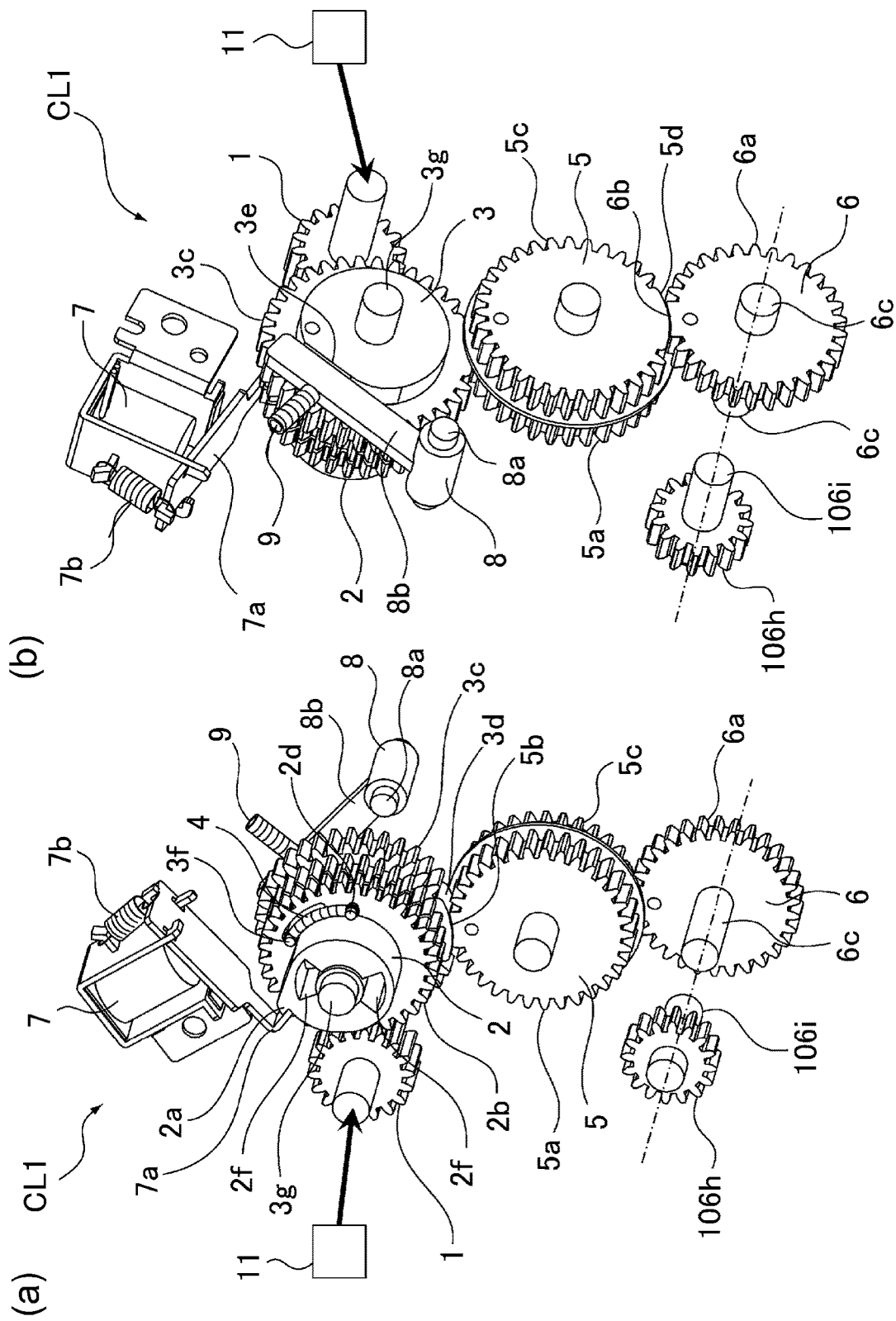

Part (a) of FIG. 3 is a perspective view showing a structure of a clutch device according to a first embodiment as seen from a switching driving gear side, and part (b) of FIG. 3 is a perspective view showing a structure of the clutch device according to the first embodiment as seen from a side opposite from the switching driving gear.

Figure 4:
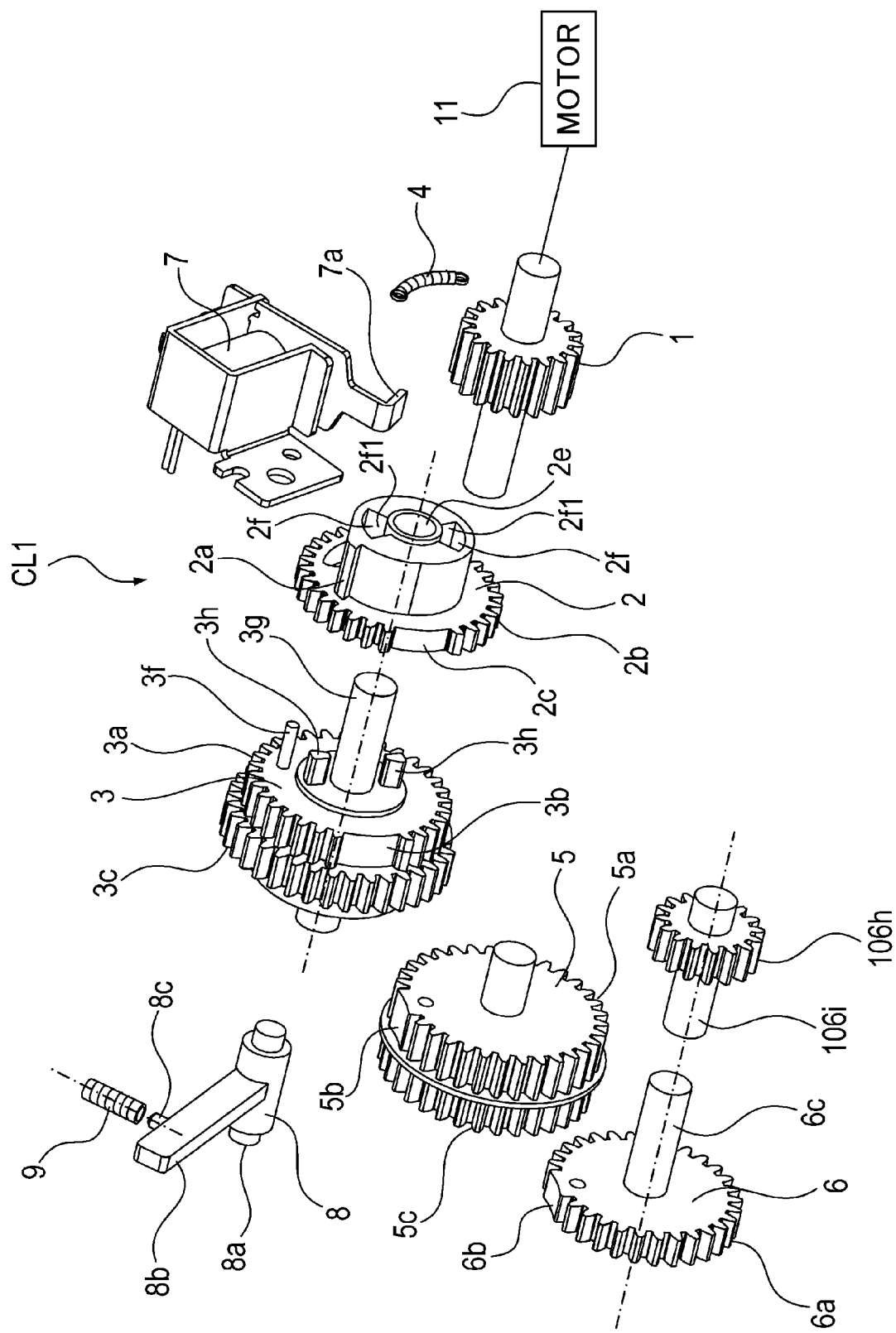

FIG. 4 is an exploded perspective view showing a structure of the clutch device in the first embodiment.

Figure 5:
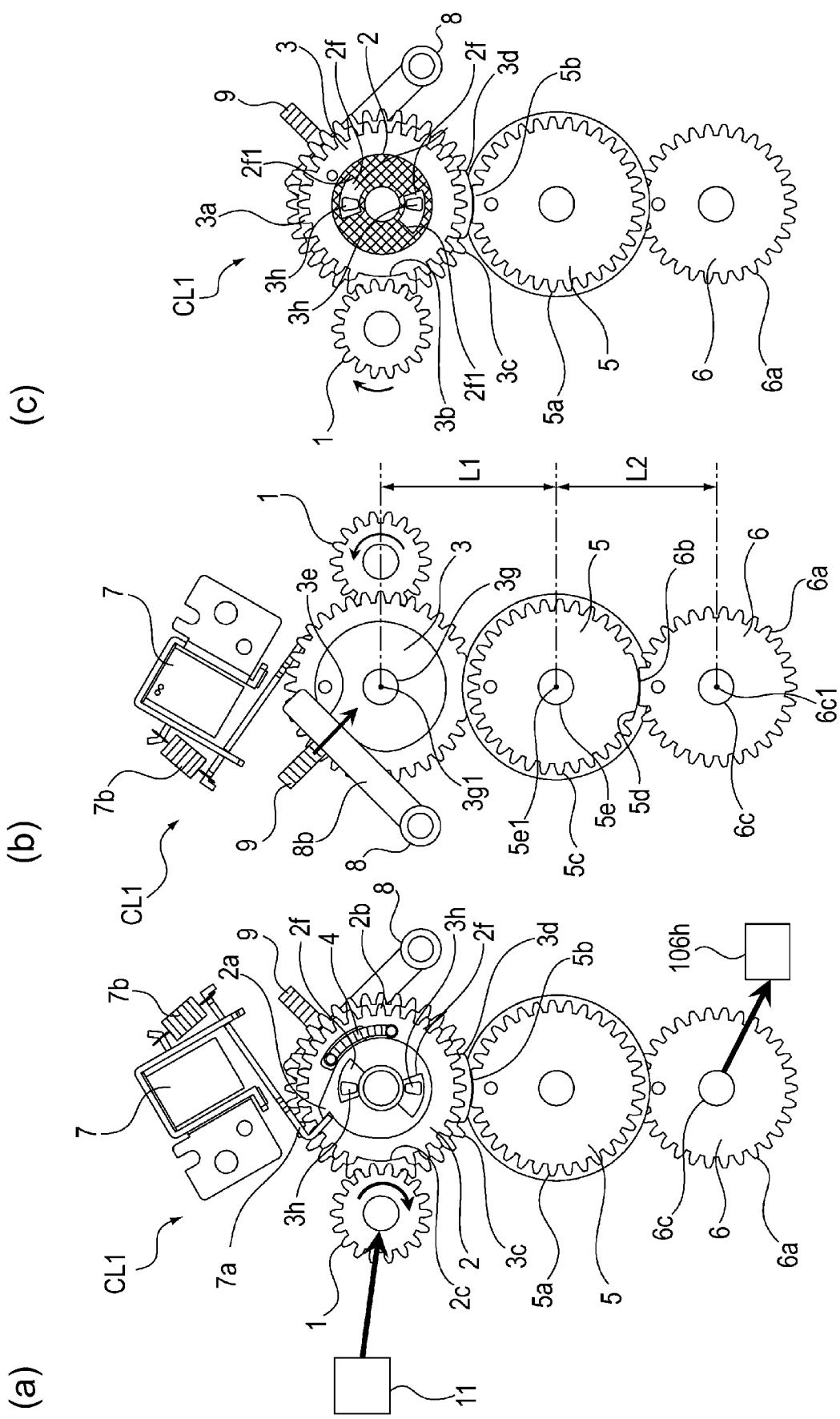

Part (a) of FIG. 5 is a front view of the clutch device in the first embodiment as seen from a front side, part (b) of FIG. 5 is a rear view of the clutch device in the first embodiment as seen from a rear side, and part (c) of FIG. 5 is a sectional view showing an amount of play between a groove portion of a trigger gear and a key portion of a follower gear when the clutch device in the first embodiment is seen from the front side.

Figure 6:
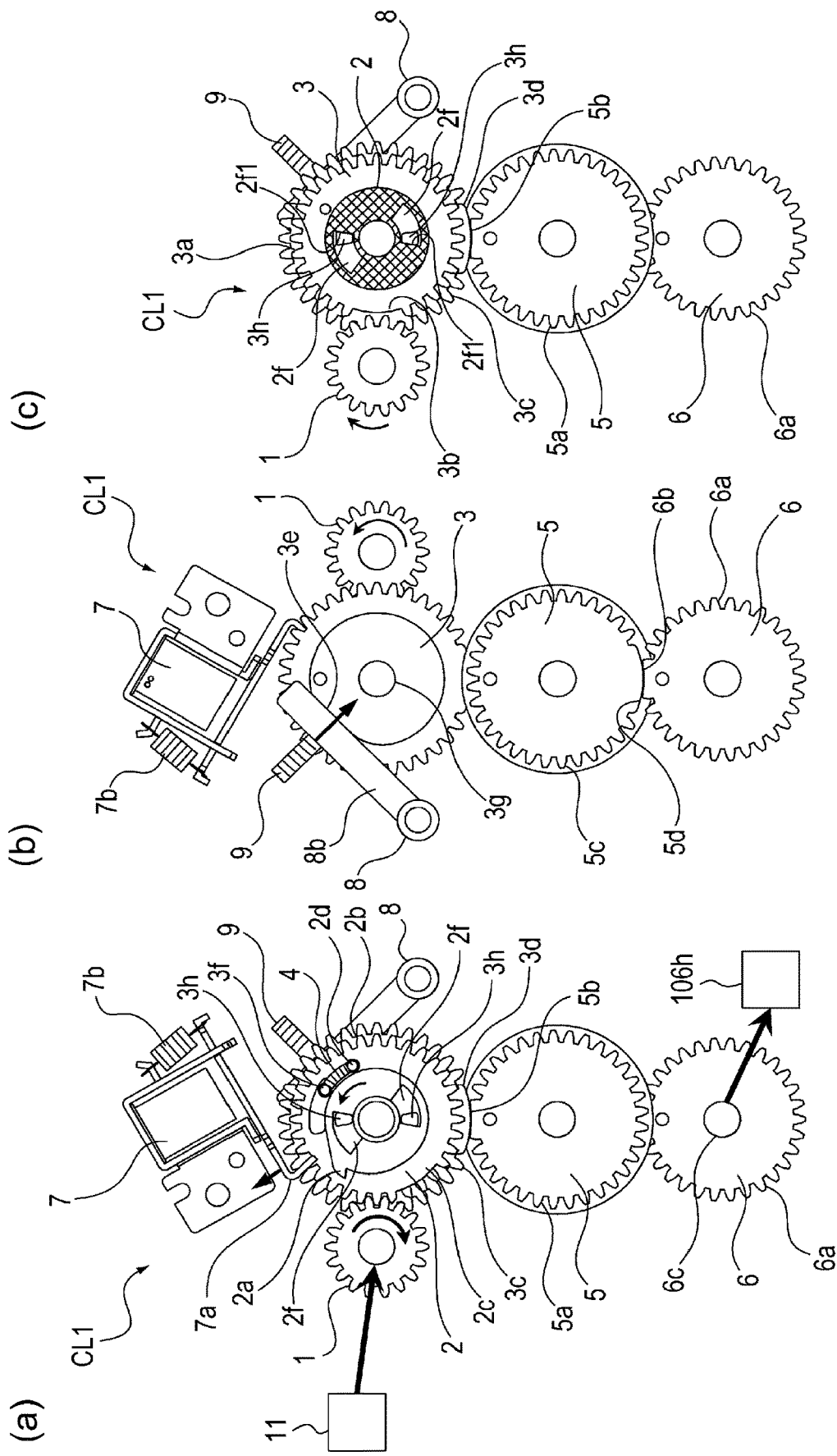

Part (a) of FIG. 6 is a front view of the clutch device in the first embodiment as seen from the front side, part (b) of FIG. 6 is a rear view of the clutch device in the first embodiment as seen from the rear side, and part (c) of FIG. 6 is a sectional view showing an amount of play between the groove portion of the trigger gear and the key portion of the follower gear when the clutch device in the first embodiment is seen from the front side.

Figure 7:
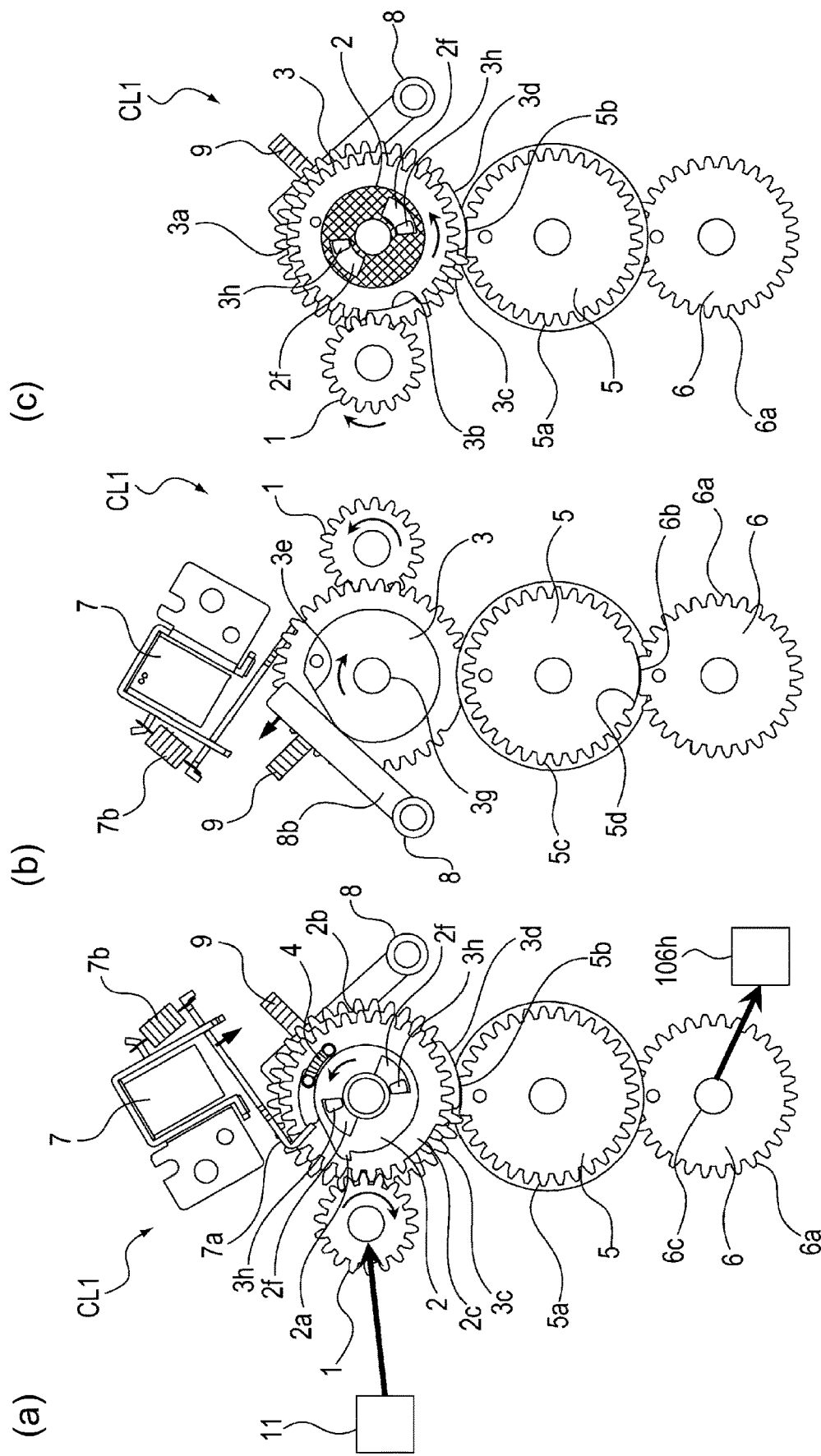

Part (a) of FIG. 7 is a front view of the clutch device in the first embodiment as seen from a front side, part (b) of FIG. 7 is a rear view of the clutch device in the first embodiment as seen from the rear side, and part (c) of FIG. 7 is a sectional view showing an amount of play between the groove portion of a trigger gear and the key portion of a follower gear when the clutch device in the first embodiment is seen from the front side.

Figure 8:
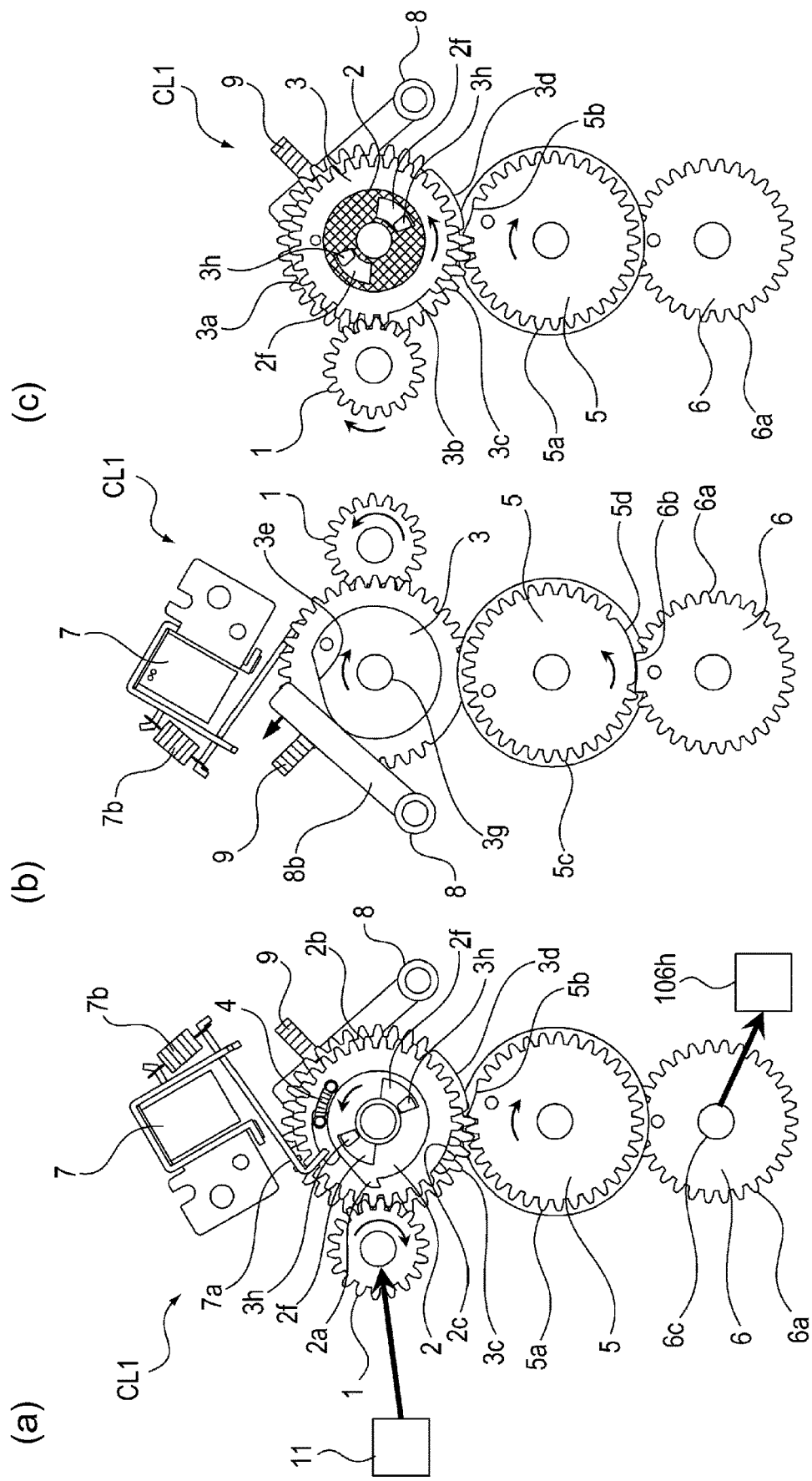

Part (a) of FIG. 8 is a front view of the clutch device in the first embodiment as seen from the front side, part (b) of FIG. 8 is a rear view of the clutch device in the first embodiment as seen from the rear side, and part (c) of FIG. 8 is a sectional view showing an amount of play between the groove portion of the trigger gear and the key portion of the follower gear when the clutch device in the first embodiment is seen from the front side.

Figure 9:
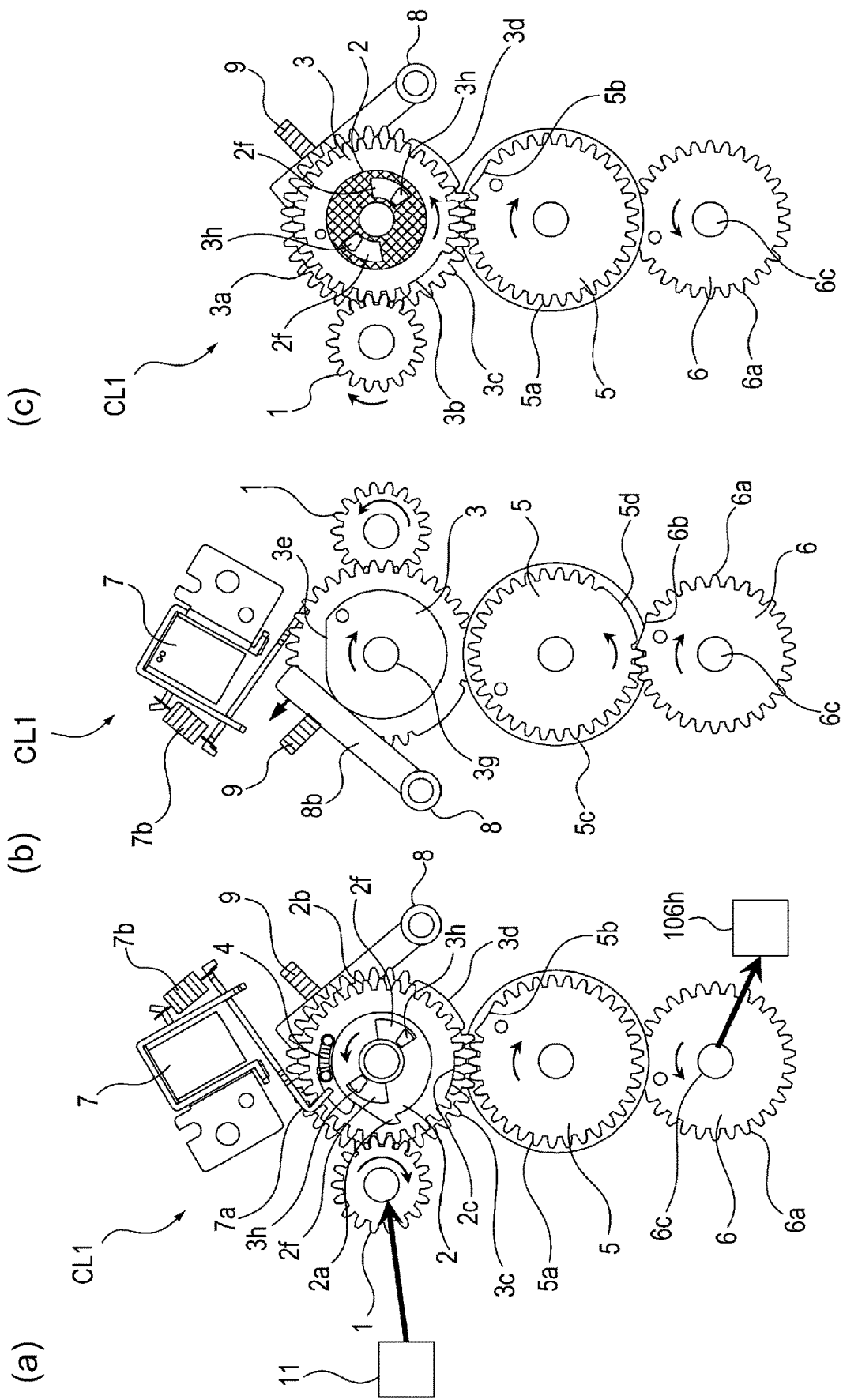

Part (a) of FIG. 9 is a front view of the clutch device in the first embodiment as seen from a front side, part (b) of FIG. 9 is a rear view of the clutch device in the first embodiment as seen from the rear side, and part (c) of FIG. 9 is a sectional view showing an amount of play between the groove portion of a trigger gear and the key portion of a follower gear when the clutch device in the first embodiment is seen from the front side.

Figure 10:
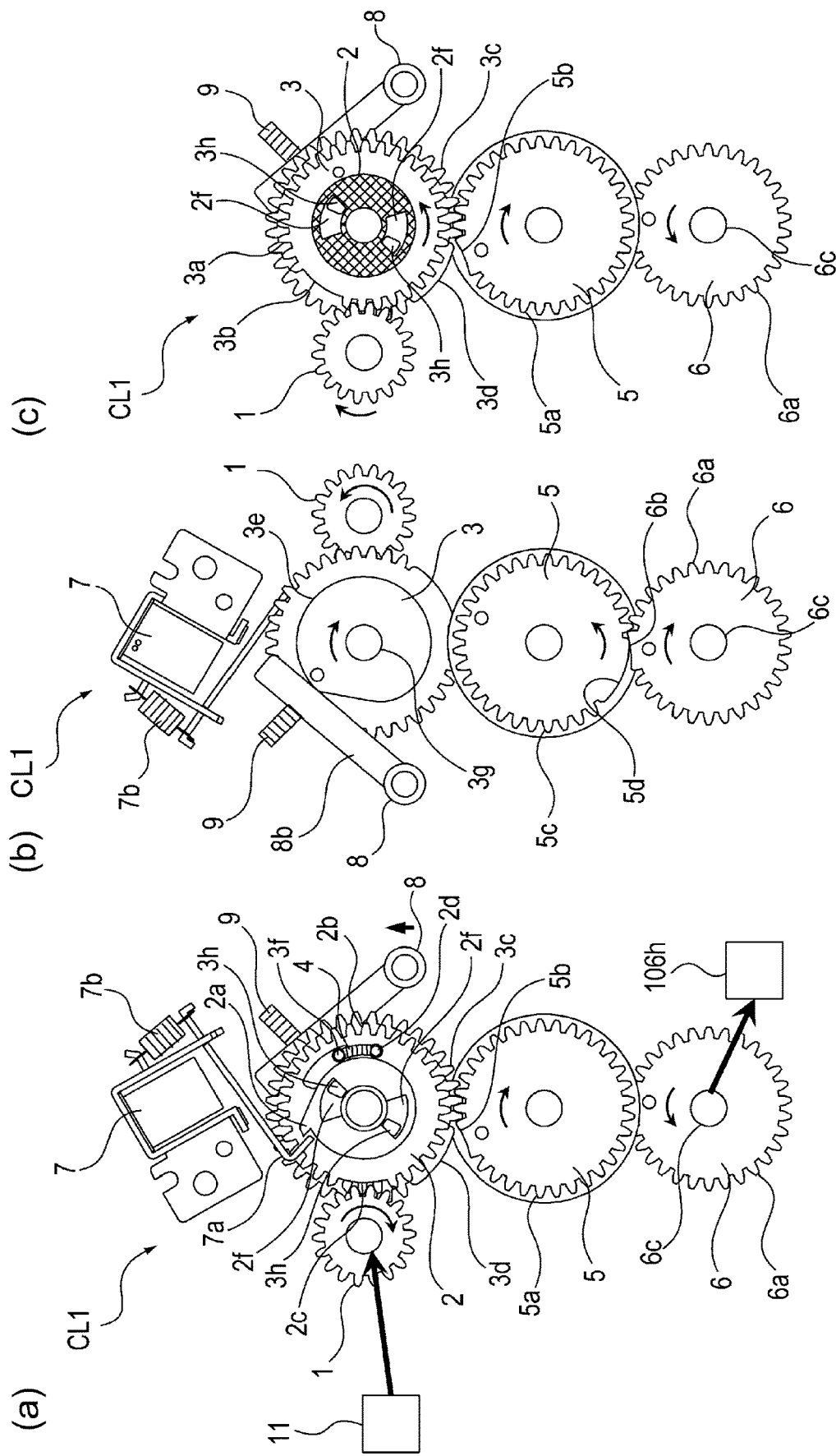

Part (a) of FIG. 10 is a front view of the clutch device in the first embodiment as seen from the front side, part (b) of FIG. 10 is a rear view of the clutch device in the first embodiment as seen from the rear side, and part (c) of FIG. 10 is a sectional view showing an amount of play between the groove portion of the trigger gear and the key portion of the follower gear when the clutch device in the first embodiment is seen from the front side.

Figure 11:
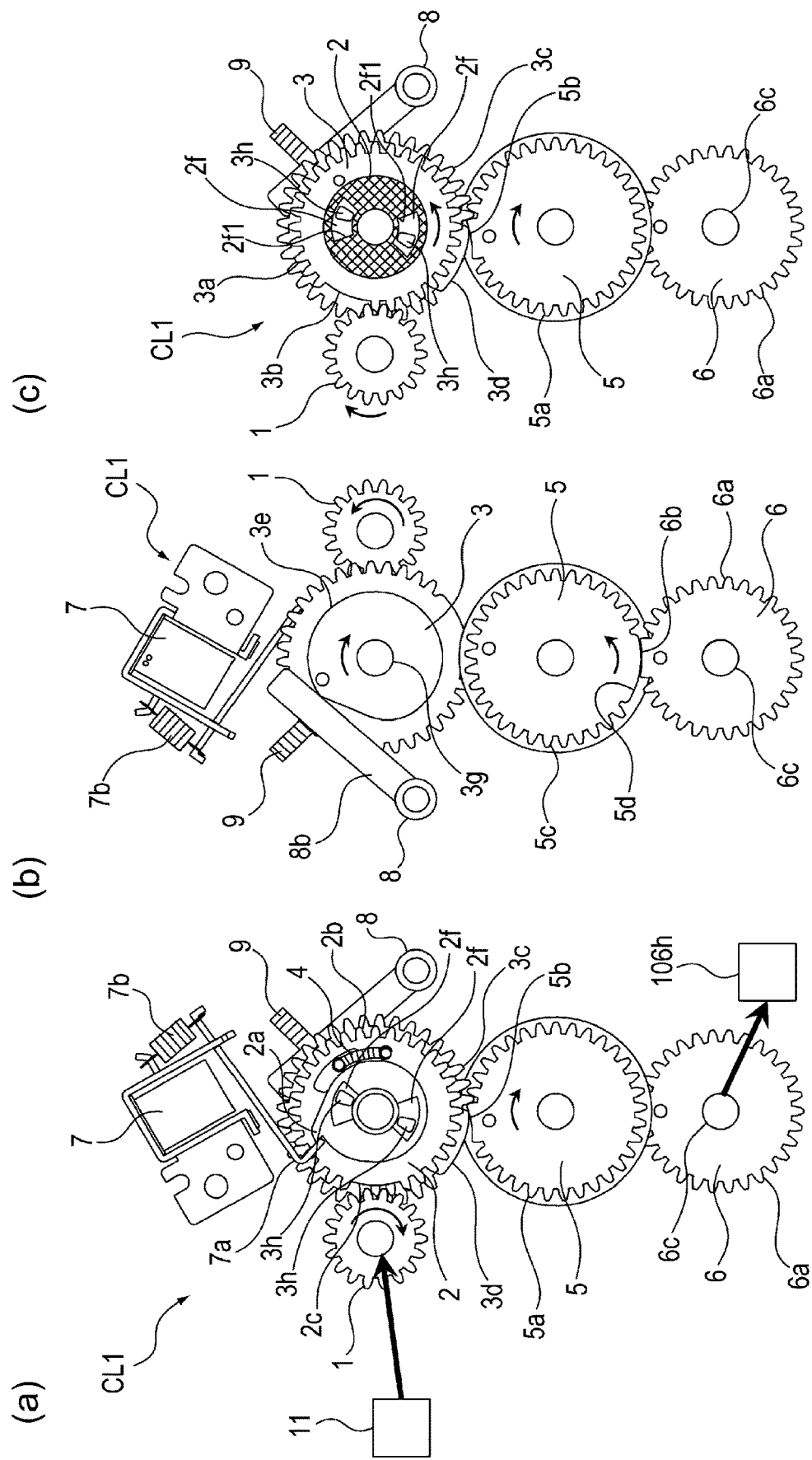

Part (a) of FIG. 11 is a front view of the clutch device in the first embodiment as seen from a front side, part (b) of FIG. 11 is a rear view of the clutch device in the first embodiment as seen from the rear side, and part (c) of FIG. 11 is a sectional view showing an amount of play between the groove portion of a trigger gear and the key portion of a follower gear when the clutch device in the first embodiment is seen from the front side.

Figure 12:
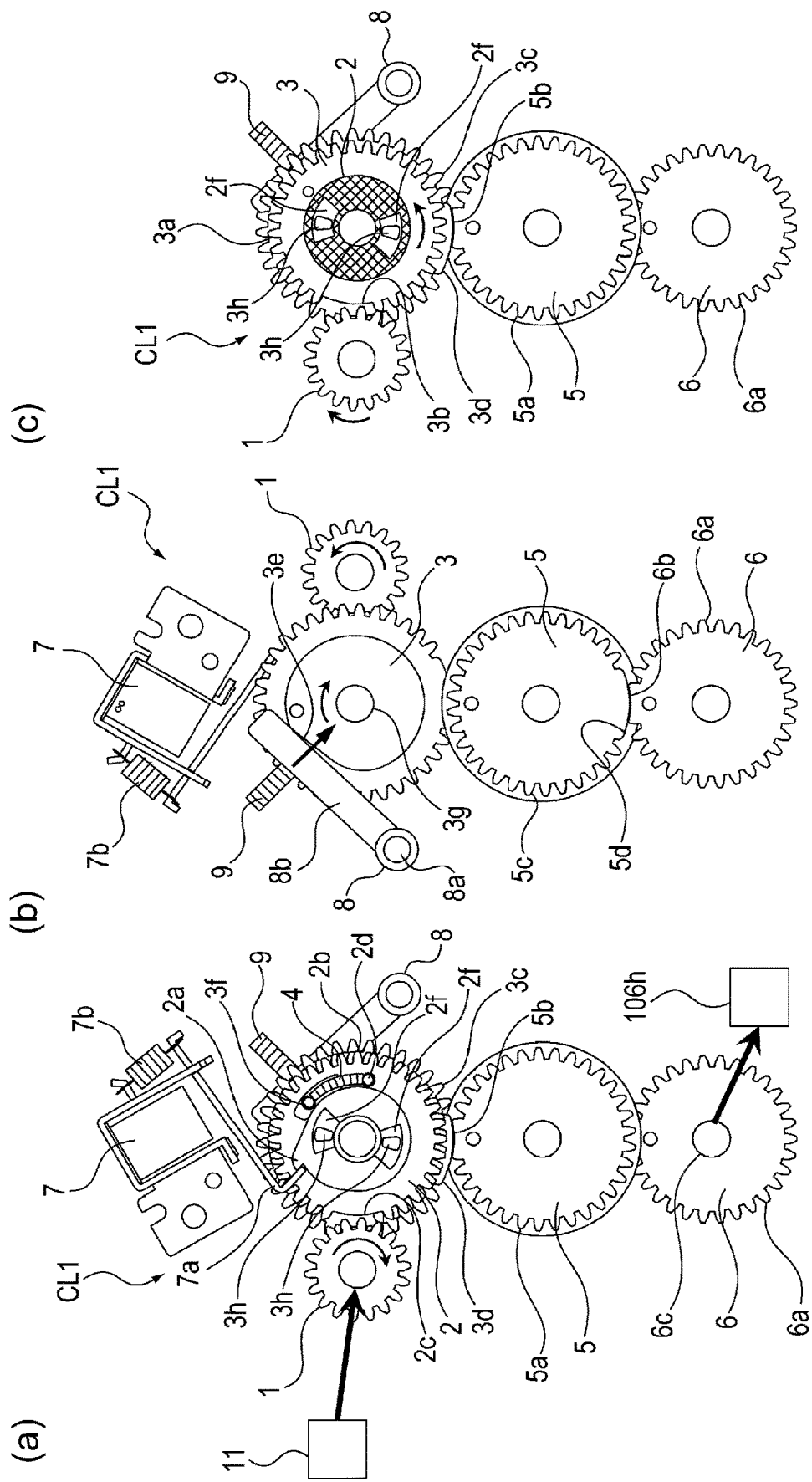

Part (a) of FIG. 12 is a front view of the clutch device in the first embodiment as seen from the front side, part (b) of FIG. 12 is a rear view of the clutch device in the first embodiment as seen from the rear side, and part (c) of FIG. 12 is a sectional view showing an amount of play between the groove portion of the trigger gear and the key portion of the follower gear when the clutch device in the first embodiment is seen from the front side.

Figure 13:
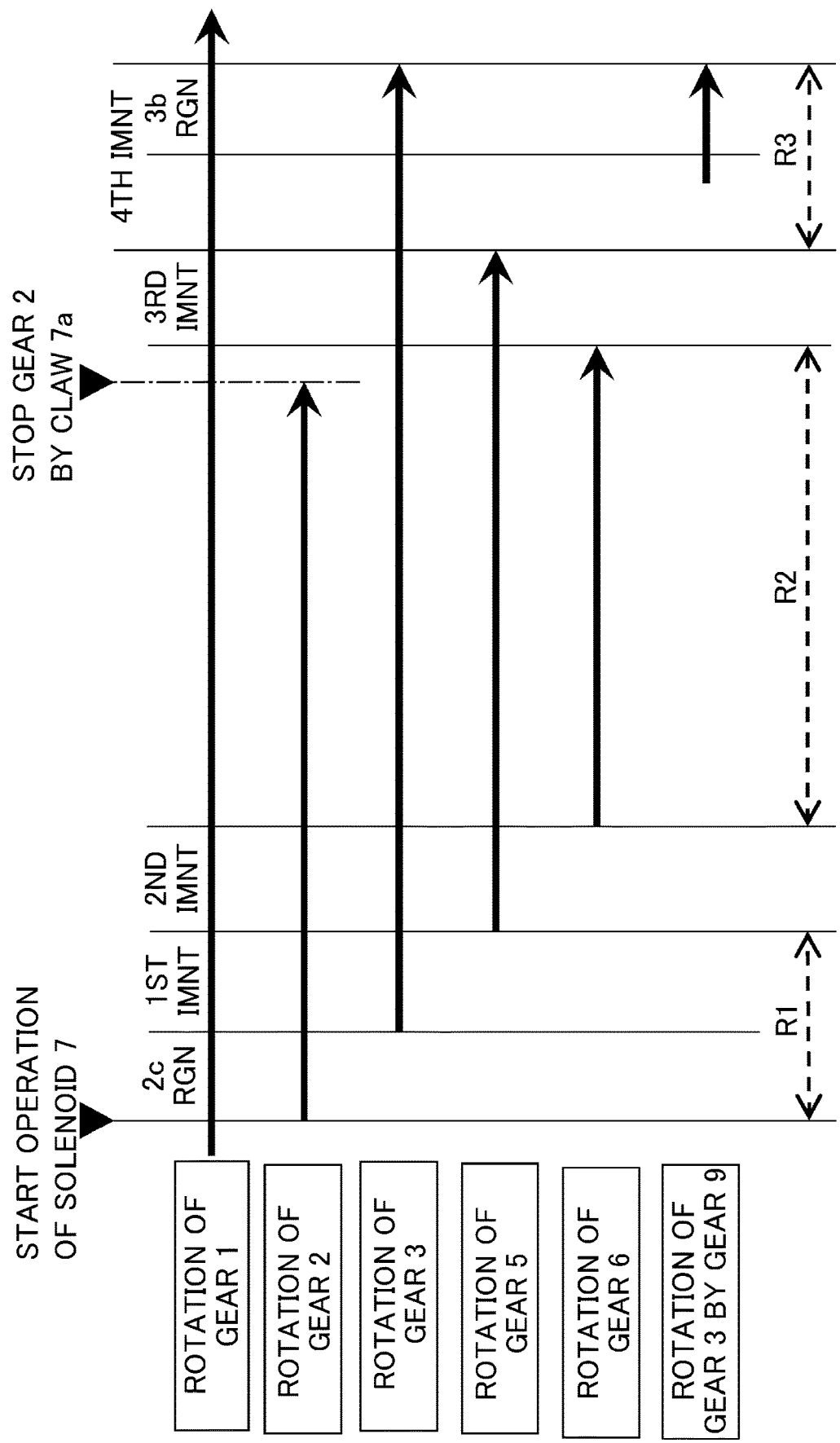

FIG. 13 is a timing chart of a rotation operation of the clutch device in the first embodiment.

Figure 14:
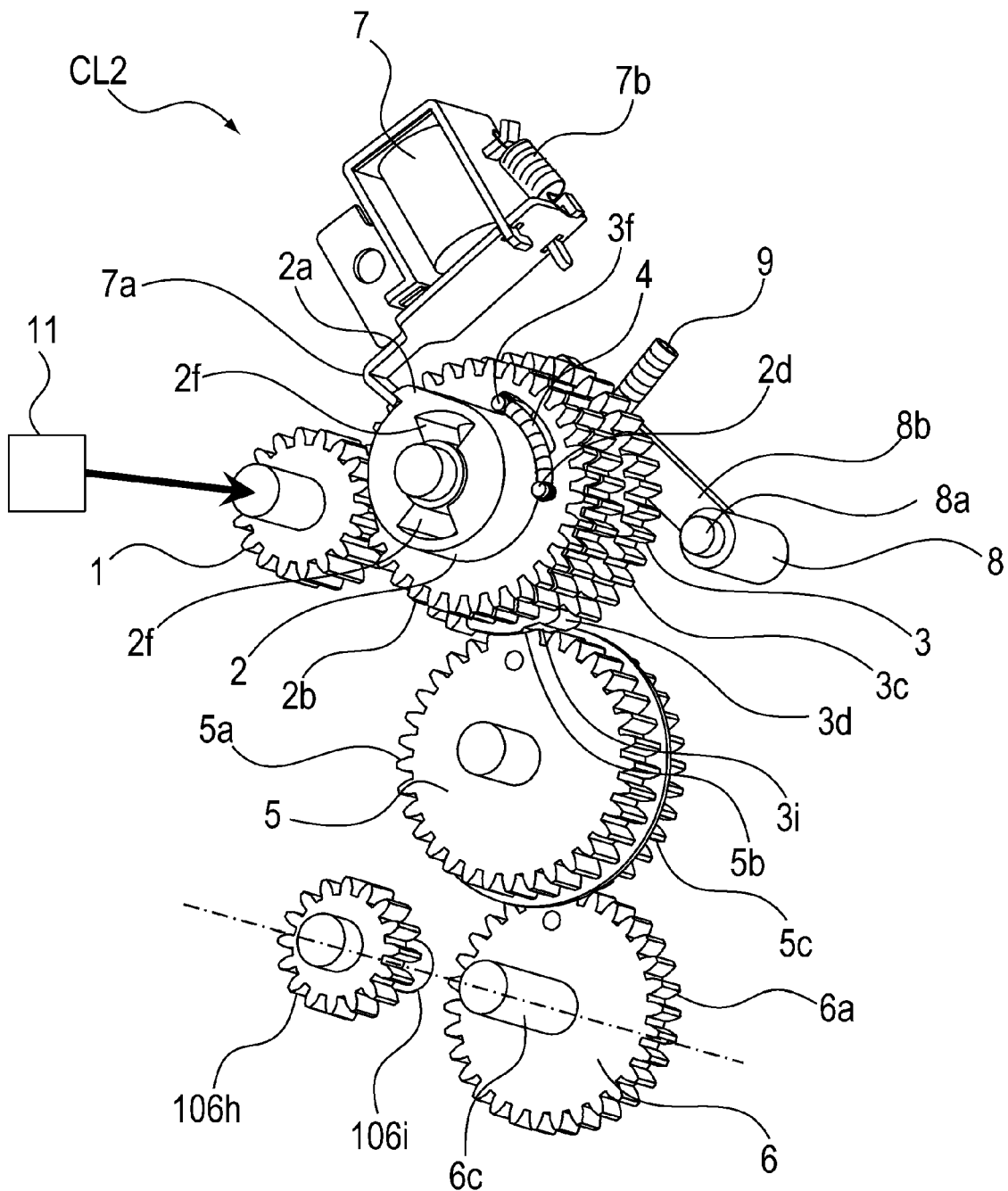

FIG. 14 is a perspective view showing a structure of a clutch device according to an embodiment 2.

Figure 15:
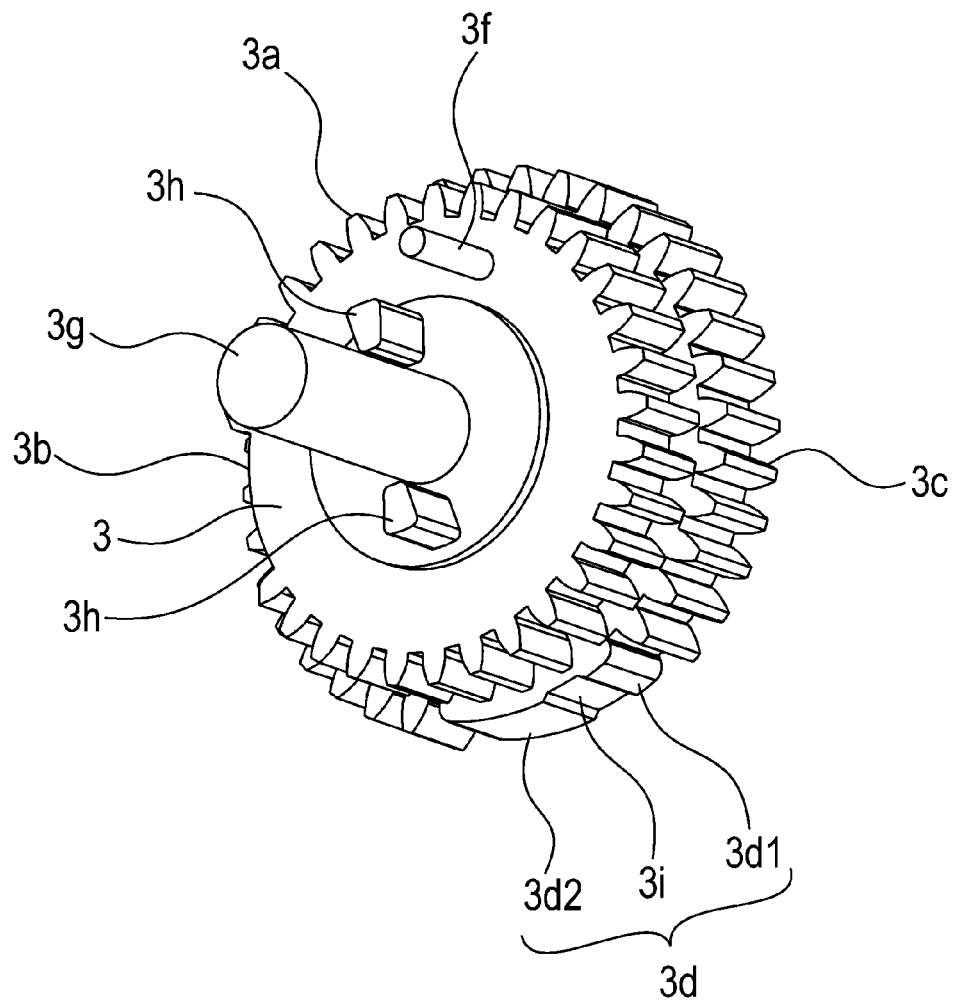

FIG. 15 is a perspective view showing a structure of a follower gear provided in the clutch device in the second embodiment.

Figure 16:
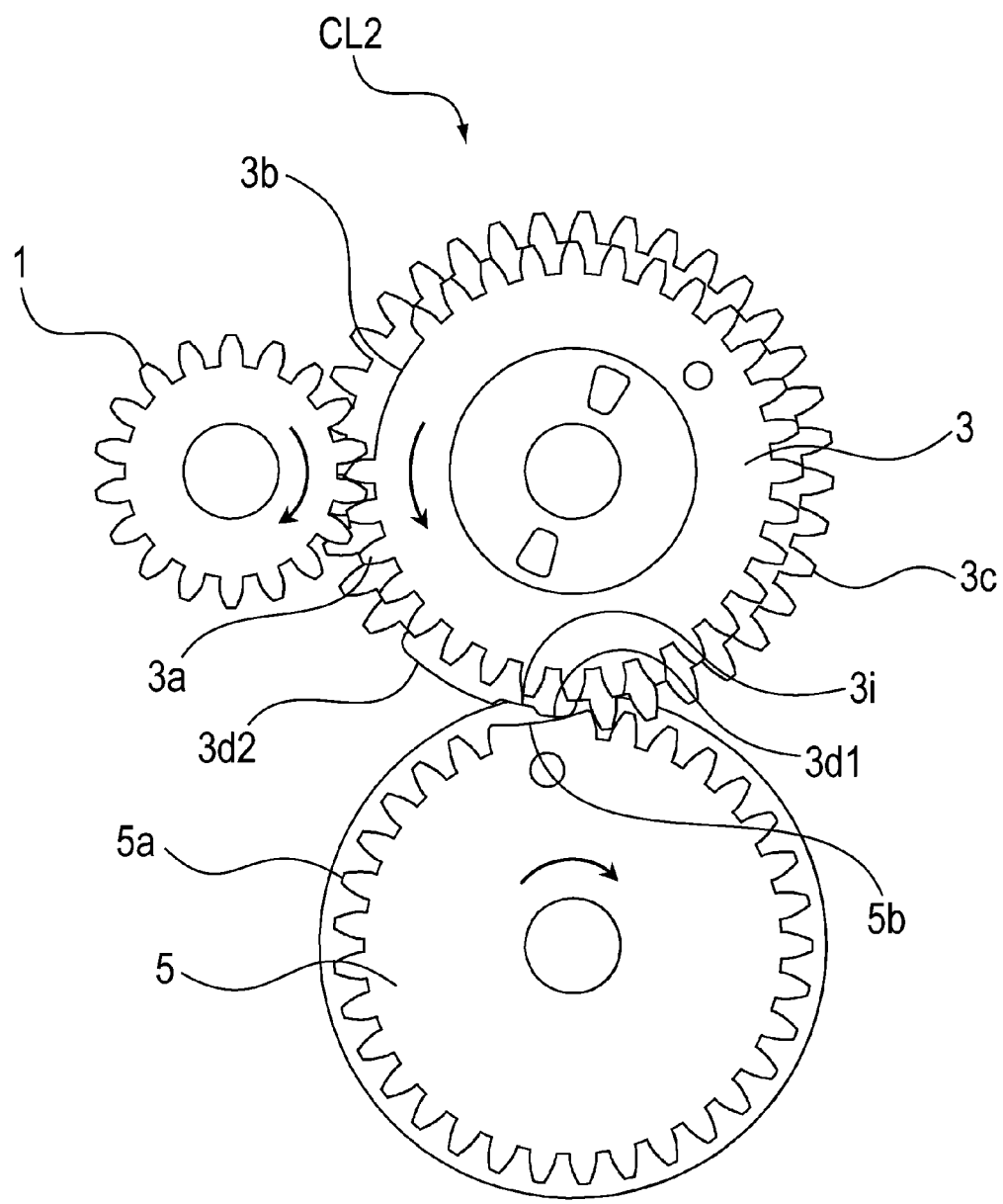

FIG. 16 is a front view for illustrating an operation of the clutch device in the second embodiment.

Figure 17:
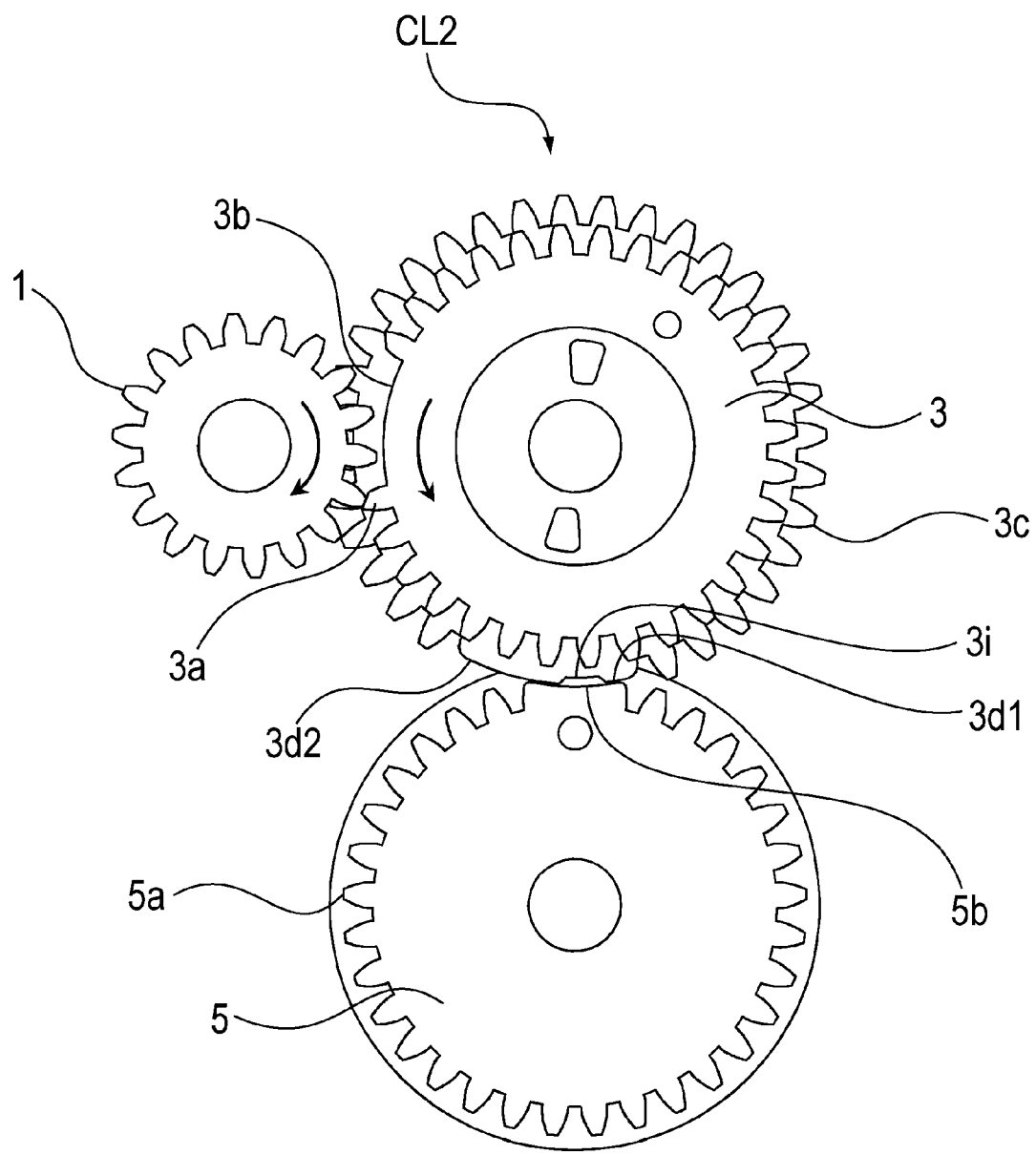

FIG. 17 is a front view for illustrating an operation of the clutch device in the second embodiment.

Figure 18:
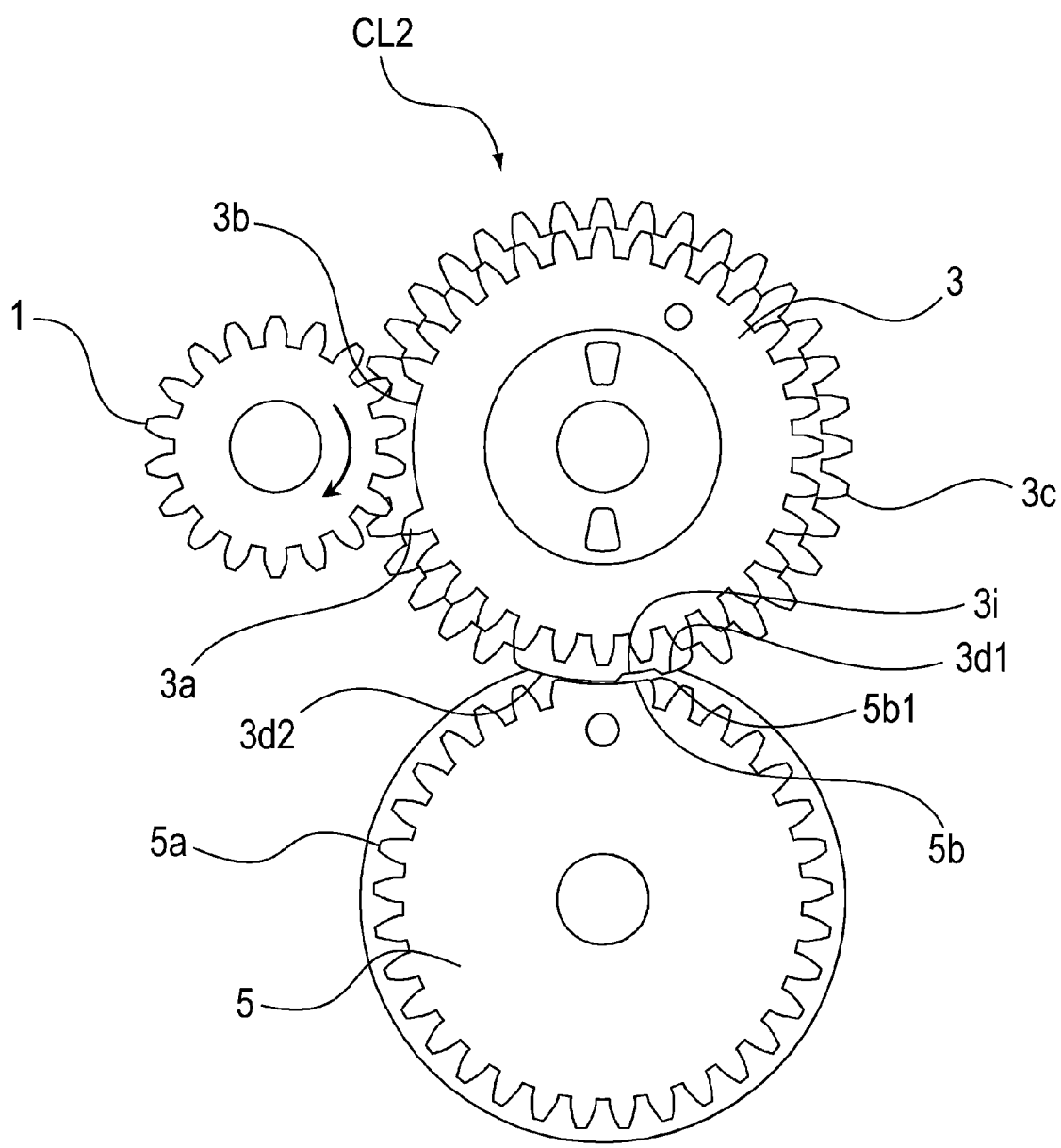

FIG. 18 is a front view for illustrating an operation of the clutch device in the second embodiment.

DESCRIPTION OF EMBODIMENTS

With reference to the drawings, an embodiment of a drive transmission device according to the present invention and an image forming apparatus including the drive transmission device will be described specifically.

First Embodiment

With reference to FIGS. 1 to 13, a first embodiment of the drive transmission device according to the present invention and the image forming apparatus including the drive transmission device will be described.

<Image Forming Apparatus>

Figure 1:
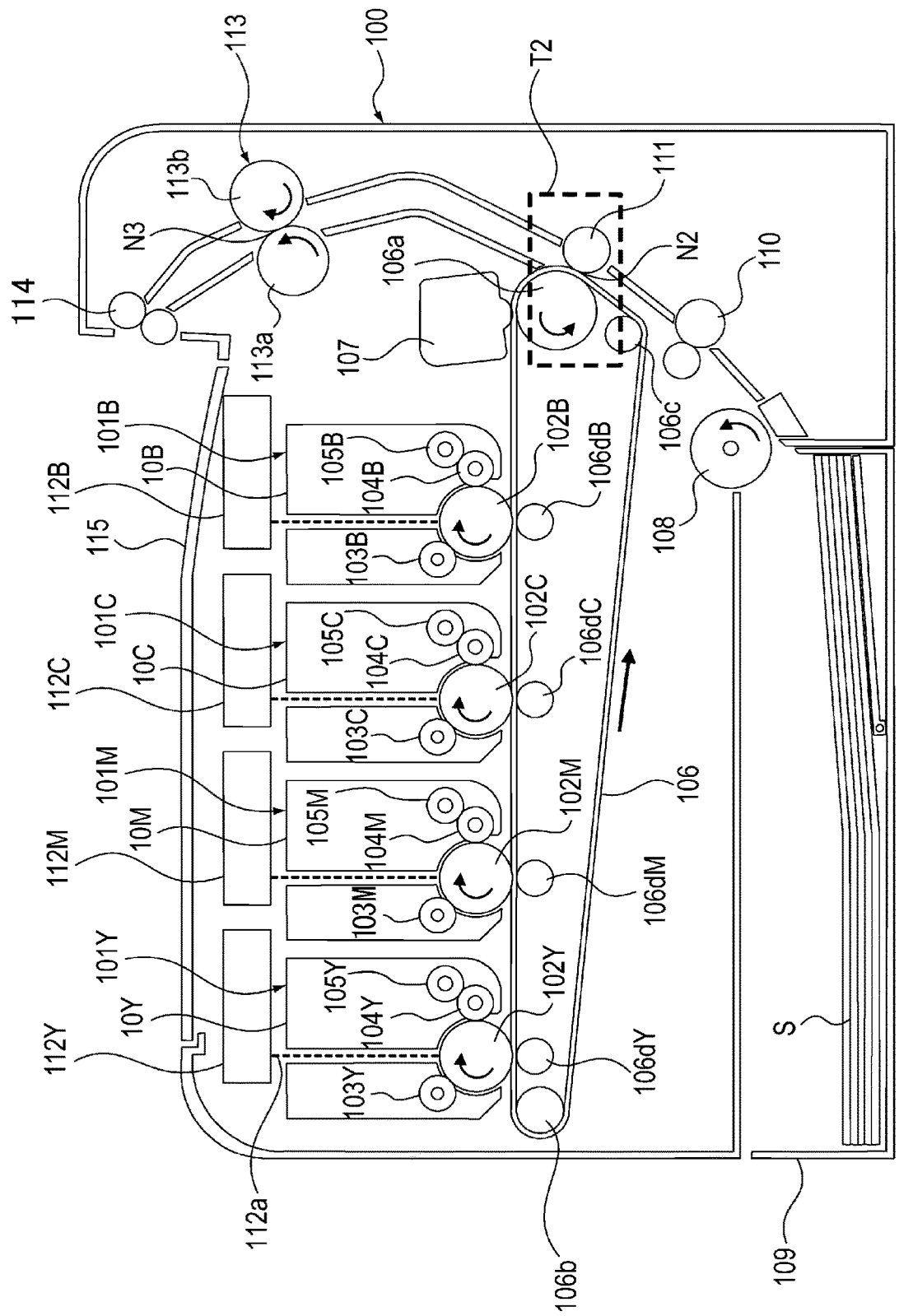
FIG. 1 is a sectional view showing a structure of an image forming apparatus.

A structure of an image forming apparatus 100 will be described using FIG. 1. FIG. 1 is a sectional view showing the structure of the image forming apparatus 100. The image forming apparatus 100 shown in FIG. 1 is an example of a full-color laser beam printer including image forming portions for forming toner images of four colors of yellow Y, magenta M, cyan C and black B. The image forming apparatus 100 forms an image on a recording material such as paper.

As shown in FIG. 1, the image forming apparatus 100 includes four cartridges 101Y, 101M, 101C and 101B. The respective cartridges 101Y, 101M, 101C and 101b are similarly constituted except that colors of toners used are different from each other, and therefore, will be described using the cartridge 101 in some cases. This is true for other image forming process means.

Each cartridge 101 includes a photosensitive drum 102 as an image bearing member. At a periphery of the photosensitive drum 102, a charging roller 103 for electrically charging uniformly a surface of the photosensitive drum 102. Further, a laser scanner 112 as an exposure means for irradiating the surface of the uniformly charged photosensitive drum 102 with laser light 112a depending on image information of the associated color is provided.

Further, at the periphery of the photosensitive drum 102, a developing device 10 as a developing means is provided. The developing device 10 deposits toner as a developer on an electrostatic latent image formed on the surface of the photosensitive drum 102 irradiated with the laser light 112a by the laser scanner 112 and thus develops the electrostatic latent image into a toner image. In the developing device 10, a developing roller 104 as a developer carrying member is provided. In a developing container of the developing device 10, the toner of the associated color is accommodated and is supplied to a surface of the developing roller 104 by rotation of a supplying roller 105 provided in the developing container. A belt 106 onto which the toner image borne on the surface of the photosensitive drum 102 as the image bearing member is constituted by an endless belt. The belt 106 is extended around a driving roller 106a, a follower roller 106b and a tension roller 106c. The belt 106 is an image bearing member as an intermediary transfer member capable of bearing the toner image on an outer peripheral surface of the belt 106. Further, the belt 106 is rotationally driven by rotation of the driving roller 106a in the counterclockwise direction of FIG. 1, so that the outer peripheral surface of the belt 106 is moved.

On an inner peripheral surface side of the belt 106, at positions opposing the respective photosensitive drums 102, four primary transfer rollers 106d as primary transfer means for transferring the toner images from the surfaces of the photosensitive drums 102 onto the belt 106 are provided. Further, a cleaning device 107 as a cleaning means for removing transfer residual toner remaining on the outer peripheral surface of the belt 106 is provided.

<Image Forming Operation>

An image forming operation of the image on a recording material S will be described with reference to FIG. 1. The image forming apparatus 100 feeds recording materials S, accommodated in a (sheet) feeding cassette 109, one by one by rotating a (sheet) feeding roller 108 in the counterclockwise direction of FIG. 1 and conveys the recording material S to a registration roller pair 110. In synchronism with the image forming operation of the toner image formed on the outer peripheral surface of the belt 106, by the registration roller pair 110, the recording material S is conveyed to a secondary transfer portion T2 constituted by a secondary transfer roller 111 as a secondary transfer means capable of being contacted to and separated from the outer peripheral surface of the belt 106. The secondary transfer roller 111 secondary-transfers the toner image, primary-transferred on the outer peripheral surface of the belt 106, onto the recording material S.

On the other hand, in synchronism with the feeding (conveying) operation of the recording material S, each of the surfaces of the photosensitive drums 102 is electrically charged uniformly by the associated charging roller 103 as the charging means while being rotated in the clockwise direction shown in FIG. 1. Further, the surface of the photosensitive drum 102 is exposed to light by the laser scanner 112 as the exposure means for irradiating the photosensitive drum surface with the laser light 112a depending on an image signal while being rotated in the clockwise direction of FIG. 1, so that the electric latent image corresponding to the associated color is formed on the surface of the photosensitive drum 102.

The electrostatic latent image formed on the surface of the photosensitive drum 102 is developed and visualized as the toner image by being supplied with the toner of the associated color as the developer by the developing roller 104. The surfaces of the photosensitive drums 102 contact the outer peripheral surface of the belt 106, and the toner images borne on the surfaces of the photosensitive drums 102 are successively transferred onto the outer peripheral surface of the belt 106 by the primary transfer rollers 106d.

The toner images transferred superposedly on the outer peripheral surface of the belt 106 are moved to a secondary transfer nip N2 formed by the belt 106 contacting the driving roller 106a and by the secondary transfer roller 111. Thereafter, in the secondary transfer nip N2, the toner images borne on the outer peripheral surface of the belt 106 are secondary-transferred onto the recording material S.

The toner images secondary-transferred on the recording material S are conveyed to a fixing device 113 as a fixing means and are heated and pressed during conveyance through a fixing nip N2 formed by a fixing roller 113a and a pressing roller 113b. The recording material S on which the toner images are fixed is discharged by a discharging roller pair 114, in a state in which a toner image surface faces downward, onto a discharge tray 115 provided at an upper portion of the image forming apparatus 100, so that the image forming operation is ended.

<Contact and Separation Mechanism for Secondary Transfer Roller>

Next, with reference to FIG. 2, the contact and separation mechanism 12 for the secondary transfer roller 111 relative to the belt 106 will be described. Part (a) of FIG. 2 is a perspective view showing a structure of the secondary transfer portion where the secondary transfer roller 111 is contacted to the belt 106. Part (b) of FIG. 2 is a perspective view showing a structure of the secondary transfer portion where the secondary transfer roller 111 is separated from the belt 106.

Part (a) of FIG. 2 shows a state in which the secondary transfer roller 111 contacts the belt 106. Part (b) of FIG. 2 shows a state in which the secondary transfer roller 111 separates from the belt 106. The secondary transfer roller 111 is rotatably supported by a holder 111a. Incidentally, in parts (a) and (b) of FIG. 2, one end portion side of the secondary transfer roller 111 with respect to a longitudinal direction is shown, but the other end portion side of the secondary transfer roller 111 with respect to the longitudinal direction is also similarly constituted.

The contact and separation mechanism 12 as a driven member for causing the secondary transfer roller 111 to be contacted to and separated from the belt 106 is constituted so that a rotational driving force from a motor 11 is transmitted thereto through a clutch device CL1. The contact and separation mechanism 12 includes a rotation shaft 106i to which a driving force transmitted from the motor 11 thereto through the clutch device CL1 and includes a switching driving gear 106h provided on the rotation shaft 106i. Further, the contact and separation mechanism 12 includes a switching gear portion 106g engaging with the switching driving gear 106h and a switching cam 106f rotatable integrally with the switching gear portion 106g.

Further, the contact and separation mechanism 12 includes an abutting roller 111b rotatable in contact with a cam surface of the switching cam 106f and includes the holder 111a. Further, the contact and separation mechanism 12 includes a pressing spring 111c for urging the holder 111a toward the switching cam 106f. One end portion of the pressing spring 111c is supported by the holder, and the other end portion of the pressing spring 111c is supported by an unshown supporting member.

The rotational driving force of the motor 11 is transmitted from the clutch device CL1 as a drive transmission device to the rotation shaft 106i. Then, the rotational driving portion is transmitted to the switching cam 106f through the switching driving gear 106h provided on the rotation shaft 106i and through the switching gear portion 106g. The abutting roller 111b rotates along a cam surface of the switching cam 106f while contacting the cam surface, so that the holder 111a moves along an urging direction of the pressing spring 111c. By this, the secondary transfer roller 111 rotatably supported by the holder 111a moves toward and away from the outer peripheral surface of the belt 106.

As shown in parts (a) and (b) of FIG. 2, the rotation shaft 106e supported by the unshown supporting member rotatably support thereabout the driving roller 106a for driving the belt 106 and the switching cam 106f. The switching cam 106g is integrally provided with the switching gear portion 106g.

The switching gear portion 106g is engaged with the switching driving gear 106h provided on the rotation shaft 106i, with a gear ratio of 2:1. The driving force from the motor 11 as a driving source rotates the switching driving gear 106h through the clutch device CL1, so that the switching cam 106f is integrally rotated through the switching gear portion 106g engaging with the switching driving gear 106h.

The switching cam 106f is constituted so as to rotate and stop every ½ rotation (180°) with predetermined timing by the clutch device CL1. Further, the holder 111a is provided with the abutting roller 111b, and is urged (pressed) by the pressing spring 111c in a direction in which the secondary transfer roller 111 moves toward the driving roller 106a.

The image forming apparatus 100 successively transfers the toner images of the respective colors onto the outer peripheral surface of the belt 106 while rotating the belt 106. During the transfer, a position of the secondary transfer roller 111 is restricted by abutment of the abutting roller 111b against the cam surface of the switching cam 106f as shown in part (b) of FIG. 2, so that the secondary transfer roller 111 is in a position where the secondary transfer roller 111 is separated from the belt 106 with a gear G.

The image forming apparatus 100 causes the clutch device CL1 to operate with predetermined timing before the recording material S is conveyed between the secondary transfer roller 111 and the belt 106 after the toner images of the respective colors are completely transferred onto the outer peripheral surface of the belt 106. By this, when the switching cam 106f is rotated by ½ turn, as shown in part (a) of FIG. 2, at the secondary transfer portion, the abutting roller 111b is retracted from the cam surface of the switching cam 106f, so that the secondary transfer roller 111 is contacted to the outer peripheral surface of the belt 106 by an urging force of the pressing spring 111c.

From this state, when the switching cam 106f is further rotated by ½ turn, the abutting roller 111b contacts the cam surface of the switching cam 106f, so that the switching cam 106f moves the abutting roller 111b against the urging force (pressing force) of the pressing spring 111c. Then, as shown in part (b) of FIG. 2, the secondary transfer roller 111 returns to the state in which the secondary transfer roller 111 is separated from the belt 106 with the gap G. Thus, when the secondary transfer roller 111 is separated from the belt 106 from the state in which the secondary transfer roller 111 contacts the outer peripheral surface of the belt 106, on the switching cam 106f and the switching driving gear 106h, a rotation load (driving torque) due to the urging force of the pressing spring 111c is exerted.

<Clutch Device>

Next, using FIGS. 3 and 4, a structure of the clutch device CL1 as a drive transmission device which is provided in the drive transmission mechanism for transmitting the driving force from the motor 11 to the switching cam 106f and which transmits the driving force intermittently will be described. Part (a) of FIG. 3 is a perspective view showing the structure of the clutch device CL1 as seen from the switching driving gear 106h side. Part (b) of FIG. 3 is a perspective view showing the structure of the clutch device CL1 as seen from a side opposite from the switching driving gear 106h.

An output gear 6 of the clutch device CL1 as the drive transmission mechanism shown in parts (a) and (b) of FIG. 3 is connected to the contact and separation mechanism 12 as the driven member for moving the secondary transfer roller 111 toward and away from the belt 106 shown in parts (a) and (b) of FIG. 2. By this, the rotational driving force from the motor 11 is transmitted to the contact and separation mechanism 12 as the driven member through the clutch device CL1.

FIG. 4 is an exploded perspective view showing the structure of the clutch device CL1 in this embodiment. In the following description, the switching driving gear 106h side of the clutch device CL1 is referred to as a "front side of the clutch device CL1", and the side opposite from the switching driving gear is referred to as a "rear side of the clutch device CL1".

The clutch device CL1 includes a driving gear 1 rotatable by input of the driving force form the motor 11 as the driving source and a trigger gear 2 engageable with the driving gear 1. Further, the clutch device CL1 includes a follower gear 3 rotatable in engagement with the trigger gear 2, a boss 2d provided on the trigger gear 2, and a trigger spring 4 connected to a boss 3f provided on the follower gear 3. The follower gear 3 is made rotatable by the driving gear 1.

On a drive downstream side of the follower gear 3, an intermediary gear 5 engageable with the follower gear 3 and the output gear 6 engageable with the intermediary gear 5 are provided. Further, a solenoid 7 as a restricting means for restricting rotation of the trigger gear 2 and a home spring 9 as an elastic member for causing a lever member 8 to contact the follower gear 3 by an elastic force. The intermediary gear 5 is made rotatable by the follower gear 3.

The follower gear 3 and the intermediary gear 5, and the intermediary gear 5 and the output gear 6 are gears engageable with each other. The output gear 6 is made rotatably by the intermediary gear 5 and transmits the driving force to the contact and separation mechanism 12. The home spring 9 as the elastic member displaces the follower gear 3 by an elastic force of the home spring 9 so that the follower gear 3 is put in a rotatable state by the driving force from the driving gear 1. When the follower gear 3 does not engage with the driving gear 1, the home spring 9 presses a swingable arm 8b of the lever member 8 by an elastic force (elongation force) thereof, so that the switchable arm 8b is rotated about a switch shaft 8a in the clockwise direction of part (b) of FIG. 12. The switchable arm 8b presses a cam portion 3e and thus rotates the follower gear 3 in the clockwise direction of part (b) of FIG. 12.

A driving train for transmitting the driving force from the driving gear 1 to the output gear 6 is constituted by the follower gear 3, the trigger gear 2 as the engaging member, and the intermediary gear 5. In this driving train, the intermediary gear 5 rotated by the follower gear 3 and configured to rotate the output gear 6 is included.

The driving force from the motor 11 is transmitted to the switching driving gear 106h through the driving gear 1 of the clutch device CL1, the follower gear 3, the intermediary gear 5 and the output gear 6, and rotates the switching cam 106f through the switching gear portion 106g shown in parts (a) and (b) of FIG. 2.

The trigger gear 2 is provided with a locking portion 2a where the trigger gear 2 is locked by a locking claw 7a of the solenoid 7 and thus rotation thereof is restricted, a gear portion 2b engageable with the driving gear 1, and a toothless portion 2c provided as a part of the gear portion and being non-engageable with the driving gear 1. Further, the trigger gear 2 integrally includes a boss 2d by which one end portion of the trigger spring 4 is locked. The gear portion 2b has a teeth number diameter corresponding to 32 teeth, and the toothless portion 2c is constituted by a toothless shape corresponding to 3 teeth of the gear portion 2b.

The follower gear 3 includes a gear portion engageable with the driving gear 1 and a gear portion 3c engageable with the intermediary gear 5. Further, the follower gear 3 integrally includes a cam portion 3e where the follower gear 3 is rotated by imparting thereto an urging force of the home spring 9 by contact of the switchable arm 8b of the lever member 8 to the cam portion 3e, a boss 3f by which the other end portion of the trigger spring 4 is locked, and a rotation shaft 3g.

The driving gear 1 and the follower gear 3 are gears engageable with each other. The follower gear 3 includes a toothless portion 3b where the gear portion engageable with the driving gear 1 is not formed. As a part of the gear portion 3c, a projection-shaped intermittent projection 3d which is a first arcuate surface having the same radius as a pitch (circle) radius of the gear portion 3c. The gear portion 3a has a teeth number diameter corresponding to 32 teeth, and the toothless portion 3b is constituted by a toothless shape corresponding to 3 teeth of the gear portion 3a. The gear portion 3c has a teeth number diameter corresponding to 36 teeth, and the intermittent projection 3d as the first arcuate surface is constituted by a projected arcuate shape corresponding to 5 teeth of the gear portion 3c.

The intermediary gear 5 includes a gear portion 5a engageable with the gear portion 3c of the follower gear 3 and a gear portion 5c engageable with the output gear 6. As a part of the gear portion 5a, an intermittent recess 5b as a second arcuate surface extending along the intermittent projection 3d as the first arcuate surface is provided.

As shown in part (a) of FIG. 3, the case where the intermittent recess 5b as the second arcuate surface of the intermediary gear 5 is in a position in which the intermittent recess 5b opposes the intermittent recess 3d as the first arcuate surface of the follower gear 3 will be considered. In this case, the intermittent recess 5b as the second arcuate surface of the intermediary gear 5 has a recessed shape concentric with a rotation center of the gear portion 3c and is constituted by an arcuate surface extending along an arcuate surface of the intermittent projection 3d as the first arcuate surface. A radius of the arcuate surface of the intermittent recess 5b as the second arcuate surface is substantially equal to a pitch radius of the gear portion 3c of the follower gear 3.

The gear portion 5a of the intermediary gear 5 has a teeth number diameter corresponding to 33 teeth, and the intermittent recess 5b as the second arcuate surface is constituted by a recessed arcuate shape corresponding to 3 teeth of the gear portion 5a. The number of teeth of the gear portion 3c of the follower gear 3 is 31 teeth, and the number of teeth of the gear portion 5a of the intermediary gear 5 engageable with the gear portion 3c is 30 teeth which is less than the number of teeth of the gear portion 3c is 1 tooth. The intermittent recess 5b as the second arcuate surface has the arcuate shape as described above, so that when the follower gear 3 rotates one full turn, the intermediary gear 5 rotates one full turn.

Further, the follower gear 4 and the intermediary gear 5 are assembled by aligning relative rotational phases with each other so that when the follower gear 3 and the intermediary gear 5 rotates, the intermittent projection 3d as the first arcuate surface and the intermittent recess 5b as the second arcuate surface move along with each other. Further, as a part of the gear portion 5c, an intermittent projection 5d as a third arcuate surface which has a projected shape and which is an arcuate surface having the same radius as a pitch and radius of the gear portion 5c. The gear portion 5c has a teeth number diameter corresponding to 33 teeth, and the intermittent projection 5d as the third arcuate surface is constituted by a projected arcuate shape corresponding to 5 teeth of the gear portion 5c.

The output gear 6 includes a gear portion 6a engageable with the gear portion 5c of the intermediary gear 5 and includes a rotation shaft 6c. As a part of the gear portion 6a, an intermittent recess 6b as a fourth arcuate surface which does not engage with the gear portion 5c of the intermediary gear 5 and which extends along the intermittent projection 5d as the third arcuate surface. The case where the intermittent recess 6d as the fourth arcuate surface is in a position where the intermittent recess 6d opposes the intermittent projection 5d as the third arcuate surface will be considered. In this case, the intermittent recess 6b as the fourth arcuate surface has a recessed shape concentric with a rotation center of the gear portion 3c and is an arcuate surface extending along an arcuate surface of the intermittent projection 5d as the third arcuate surface, and a radius of the arcuate surface (intermittent recess 6b) is substantially equal to a pitch radius of the gear portion 5c of the intermediary gear 5.

The gear portion 6a has a teeth number diameter corresponding to 30 teeth, and the intermittent recess 6b as the fourth arcuate surface is constituted by a recessed arcuate portion corresponding to 3 teeth of the gear portion 6a. The number of teeth of the gear portion 5c of the intermediary gear 5 is 28 teeth and the number of teeth of the gear portion 6a of the output gear 6 engageable with the gear portion 5c is 27 teeth, but when the intermediary gear 5 is rotated one full turn by the intermittent recess 6b as the fourth arcuate surface having the arcuate shape as described above, the output gear 6 is rotated one full turn.

Further, the intermediary gear 5 and the output gear 6 are assembled by aligning relative rotational phases with each other so that when the intermediary gear 5 and the output gear 6 rotate, the intermittent projection 5d as the third arcuate surface of the intermediary gear 5 and the intermittent recess 6b as the fourth arcuate surface of the output gear 6 move along with each other as shown in part (b) of FIG. 3. The rotation shaft 6c of the output gear 6 are connected integrally with the rotation shaft 106i of the switching driving gear 106h shown in parts (a) and (b) of FIG. 2. By this, the output gear 6 is rotated, whereby the switching driving gear 106h is rotated integrally with the output gear 6.

The solenoid 7 includes the locking claw 7a and a returning spring 7b. The returning spring 7b urges the locking claw 7a in a direction toward the trigger gear 2. When energization to the solenoid 7 is not carried out and the locking portion 2a of the trigger gear 2 is in a position where the locking portion 2a opposes the locking claw 7a, the locking claw 7a locks the locking portion 2a and thus is capable of restricting rotation of the trigger gear 2.

When the energization to the solenoid 7 is carried out, the locking claw 7a retracts from the trigger gear 2 against a tensile force (urging force) of the returning spring 7b. In the case where the locking portion 2a of the trigger gear 2 is locked by the locking claw 7a until then, locking of the locking portion 2a of the trigger gear 2 by the locking claw 7a can be released.

The trigger spring 4 is locked and fixed to the boss 2d of the trigger gear 2 at one end portion thereof and is locked and fixed to the boss 3f of the follower gear 3 at the other end portion thereof. For this reason, by a tensile force of the trigger spring 4, the trigger gear 2 is urged in a direction in which the trigger gear 2 is attracted to the follower gear 3. For this reason, when the locking claw 7a releases the lock of the locking portion 2a of the trigger gear 2 by energizing the solenoid 7, a rotational force is imparted to the trigger gear 2 by the tensile force of the trigger spring 4, so that the gear portion 2b of the trigger gear 2 and the driving gear 1 are engaged with each other.

The lever member 8 swings about a swing shaft 8a as a rotation center and includes a swingable arm 8b contactable to the cam portion 3e of the follower gear 3 and includes a boss 8c. To the boss 8c, one end portion of the home spring 9 is mounted by engagement. The other end portion of the home spring 9 is supported at a fixing position by an unshown supporting member. When the follower gear 3 is in a predetermined rotational phase, the swingable arm 8b presses the cam portion 3e by an elastic force (elongation force). By this, the follower gear 3 is urged so as to be rotated.

Even when the toothless portion 3b of the follower gear 3 opposes the driving gear 1 and thus the gear portion 3a cannot obtain a sufficient driving force from the driving gear 1, it becomes possible to rotate the follower gear 3 through the swingable arm 8b and the cam portion 3e by the pressing (urging) force of the home spring 8. In the case where the follower gear 3 is in a home position which is a drive transmission stand-by state in which the gear portion 3a and the driving gear 1 do not engage with each other, the swingable arm 8b of the lever member 8 contacts the cam portion 3e so that the cam portion 3e of the follower gear 3 is urged in a direction of the rotation center of the rotation shaft 3g of the follower gear 3. For this reason, a rotational position of the follower gear 3 is restricted through the swingable arm 8b and the cam portion 3e by the pressing force of the home spring 9.

Next, using part (a) of FIG. 3 and FIG. 4, arrangement constitution of the trigger gear 2 and the follower gear 3 will be described. As shown in part (a) of FIG. 3 and FIG. 4, the trigger gear 2 includes a bearing portion 2e and a plurality of grooves (groove portions) 2f, and the bearing portion 2e is engaged with the rotation shaft 3g of the follower gear 3.

At that time, a plurality of key portions 3h provided on the follower gear 3 are accommodated in the grooves 2f of the trigger gear 2. In a state in which the key portions 3h are accommodated in the grooves 2f, a constitution in which there is play between the key portion 3h and a contact surface 2f1 which is a wall surface of the groove 2f is employed. By this, the trigger gear 2 is capable of rotating about the rotation shaft 3g relative to the follower gear 3 in an amount corresponding to the play between the key portion 3h and the contact surface 2f1 which is the wall surface of the groove 2f. In this embodiment, the trigger gear 2 is configured to be capable of rotating relative to the follower gear 3 in an amount corresponding to 3 teeth.

That is, the follower gear 3 includes the trigger gear 2 as an engaging member engageable with the driving gear 1. The trigger gear 2 moves relative to the follower gear 3, so that the trigger gear 2 is movable between an engaging position with the driving gear 1 and a non-engaging position with the driving gear 1. By the boss 2d of the trigger gear 2 and the boss 3f of the follower gear 3, the trigger spring 4 as an urging means is locked. By a tensile force of the trigger spring 4, the trigger gear 2 is urged in a direction from the non-engaging position with the driving gear 1 to the engaging position with the driving gear 1.

<Operation of Clutch Device CL1>

Next, using FIGS. 5 to 13, a drive transmission operation will be described. Part (a) of each of FIGS. 5 to 12 is a front view of the clutch device CL1 as seen from a front side, part (b) of each of FIGS. 5 to 12 is a rear view of the clutch device CL1 as seen from a rear side, and part (c) of each of FIGS. 5 to 12 is a sectional view, of the clutch device CL1 as seen from the front side, showing an amount of play between the groove 2f of the trigger gear 2 and the key portion 3h of the follower gear 3.

Parts (a) to (c) of FIG. 5 show a stand-by state of the clutch device CL1. Parts (a) to (c) of FIG. 6 show a state of a start of rotation of the trigger gear 2 of the clutch device CL1. Parts (a) to (c) of FIG. 7 show a state of a start of rotation of the follower gear 3 of the clutch device CL1. Parts (a) to (c) of FIG. 8 show a state of a start of rotation of the intermediary gear 5. Parts (a) to (c) of FIG. 9 show a state of a start of rotation of the output gear 6.

Parts (a) to (c) of FIG. 10 show a state of the trigger gear 2 of the clutch device CL1 immediately before an end of the rotation. Parts (a) to (c) of FIG. 11 show a rotation stop state of the output gear 6 of the clutch device CL1. Parts (a) to (c) of FIG. 12 show a state of the intermediary gear 5 of the clutch device CL1 at the time of an end of rotation. FIG. 13 is a timing chart showing rotation operations of respective members constituting the clutch device CL1. Incidentally, rotational directions and operation directions of the respective members in FIGS. 5 to 12 are as indicated by arrows in the neighborhood of the respective members.

As shown in parts (a) and (b) of FIG. 5, in the stand-by state of the clutch device CL1, the driving gear 1 rotates, so that the swingable arm 8b of the lever member 8 is contacted to a flat surface portion of the cam portion 3e by the elastic force (elongation force) of the home spring 9. Further, the home spring 9 urges the follower gear 3 in a rotation center direction of the rotation shaft 3g of the follower gear 3. In this state, the follower gear 3 is in a home position, so that the toothless portion 3b opposes the driving gear 1 as shown in part (c) of FIG. 5. For this reason, a driving force is not transmitted from the driving gear 1 to the follower gear 3. Further, as shown in part (c) of FIG. 5, a state in which there is play between the contact surface 2f1 which is the wall surface of the groove 2f and the key portion 3h is formed.

Further, as shown in part (a) of FIG. 5, although the trigger gear 2 is urged by the tensile force of the trigger spring 4 so as to be rotated in the counterclockwise direction of part (a) of FIG. 5, by the locking claw 7a of the solenoid 7, the locking portion 2a of the trigger gear 2 is locked, so that the trigger gear 2 is at rest. In this state, the trigger gear 2 is in the home position, so that the toothless portion 2c opposes the driving gear 1. For that reason, the driving force of the driving gear 1 is not transmitted to the trigger gear 2.

At this time, as shown in part (b) of FIG. 5, the intermittent projection 5d as the third arcuate surface of the intermediary gear 5 and the intermittent recess 6b as the fourth arcuate surface of the output gear 6 are in contact with each other. In this state, rotation of the output gear 6 is restricted by the intermediary gear 5. The case where the output gear 6 rotates from the state in which the intermittent projection 5d as the third arcuate surface of the intermediary gear 5 and the intermittent recess 6b as the fourth arcuate surface of the output gear 6 are in contact with each other will be considered. In order to rotate the output gear 6, there is a need that a (shaft) center distance L2 rear a rotation center 5e1 of the rotation shaft 5e of the intermediary gear 5 and a rotation center 6c1 of the rotation shaft 6c of the output gear 6 increases. However, the center distance L2 is fixed and therefore, the output gear 6 cannot be rotated.

For this reason, even when the rotation shaft 6c of the output gear 6 receives a rotational torque from the switching driving gear 106h drive-connected thereto, the output gear 6 cannot be rotated. A rotational torque at this time is such that the switching cam 106f is intended to be rotated by pressing and rotating a cam surface of the switching cam 106f by the pressing spring 111c as an urging means shown in part (b) of FIG. 2.

Further, as shown in part (c) of FIG. 5, the intermittent projection 3d as the first arcuate surface of the follower gear 3 and the intermittent recess 5b as the second arcuate surface of the intermediary gear 5 are also in contact with each other. In this state, rotation of the intermediary gear 5 is restricted by the follower gear 3. That is, a state in which the driving force is not transmitted from the driving gear 1 to the follower gear 3 and is not transmitted from the intermediary gear 5 to the output gear 6 is formed.

The case where the intermediary gear 5 is rotated from the state in which the intermittent projection 4d as the first arcuate surface of the follower gear 3 and the intermittent recess 5b as the second arcuate surface of the intermediary gear 5 are in contact with each other will be considered. In order to rotate the intermediary gear 5, there is a need that a center distance L1 between a rotation center 3g1 of the rotation shaft 3g of the follower gear 3 and the rotation center 5e1 of the rotation shaft 5e of the intermediary gear 5 increases. However, the center distance L1 is fixed, and therefore, the intermediary gear 5 cannot be rotated. Positions of the intermediary gear 5 and the output gear 6 put in such a state are referred to as home positions.

At this time, as shown in parts (a) and (c) of FIG. 5, when the follower gear 3 is in a phase where the follower gear 3 does not rotate the intermediary gear 5, at a portion where the follower gear 3 and the intermediary gear 5 oppose each other, the gear portion 3a (tooth) of the follower gear 3 and the gear portion 5a (tooth) of the intermediary gear 5 do not engage with each other. That is, in this phase, at the portion where the follower gear 3 opposes the intermediary gear 5, the gear portion 3a is not formed. At that portion, instead of the gear portion 3a, the intermittent projection 3d as the first arcuate surface concentric with the rotation center of the follower gear 3 is provided. At this time, at a portion where the intermediary gear 5 opposes the follower gear 3, the gear portion 5c is not formed. At that portion, instead of the gear portion 5c, the intermittent recess 5b as the second arcuate surface extending along the intermittent projection 3d as the first arcuate surface.

Further, as shown in part (b) of FIG. 4, when the intermediary gear 5 is in a phase where the intermediary gear 5 does not rotate the output gear 6, at a portion where the intermediary gear 5 and the output gear 6 oppose each other, the gear portion 5a (tooth) of the intermediary gear 5 and the gear portion 6a (tooth) of the output gear 6 do not engage with each other. That is, in this phase, at the portion where the intermediary gear 5 opposes the output gear 6, the gear portion 5c is not formed. At that portion, instead of the gear portion 5c, the intermittent projection 5d as the third arcuate surface concentric with the rotation center of the intermediary gear 5 is provided. At this time, at a portion where the output gear 6 opposes the intermediary gear 5, the gear portion 6a is not formed. At that portion, instead of the gear portion 6a, the intermittent recess 6b as the fourth arcuate surface extending along the intermittent projection 5d as the third arcuate surface.

In order to perform the drive transmission by the clutch device CL1, first, there is a need to rotate the trigger gear 2. For this purpose, as shown in part (a) of FIG. 6, the solenoid 7 is energized and thus the locking claw 7a is retracted from the locking portion 2a of the trigger gear 2, so that locking of the locking portion 2a by the locking claw 7a is released. Then, by a tensile force (elastic force) of the trigger spring 4, the boss 2d of the trigger gear 2 is moved in a direction toward the boss 3f of the follower gear 3, so that the trigger gear 2 starts rotation thereof in the counterclockwise direction of part (a) of FIG. 6.

At this time, as shown in part (b) of FIG. 6, rotation of the follower gear 3 is restricted by pressing of the cam portion 3e by the swingable arm 8b due to the elastic force (elongation force) of the home spring 9, and therefore, the follower gear 3 does not rotate even when receives the tensile force (elastic force) of the trigger spring 4. When the trigger gear 2 rotates in an amount corresponding to 3 teeth, the gear portion 2b of the trigger gear 2 engages with the driving gear 1, so that the trigger gear 2 is rotated by receiving the driving force from the driving gear 1.

Further, as shown in part (c) of FIG. 6, the case where the trigger gear 2 is rotated by the tensile force of the trigger spring 4 will be considered. In this case, the follower gear 3 is held in the home position by the pressing force of the home spring 9 through the swingable arm 8b and the cam portion 3e until the play between the contact surface 2f1 which is the wall surface of the groove 2f and the key portion 3h is eliminated by the rotation of the trigger gear 2. Accordingly, as shown in part (c) of FIG. 6, in a period in which the follower gear 3 is at rest, similarly as in part (c) of FIG. 5, the intermittent projection 3d as the first arcuate surface of the follower gear 3 and the intermittent recess 5b as the second arcuate surface of the intermediary gear 5 are in contact with each other. For this reason, the intermediary gear 5 is at rest in the home position without being rotated.

The trigger gear 2 and the driving gear 1 engage each other, and the trigger gear 2 receives the driving force from the driving gear 1 and is rotated in the counterclockwise direction of part (a) of FIG. 6. Then, as shown in part (c) of FIG. 6, the play between the contact surface 2f1 which is the wall surface of the groove 2f and the key portion 3h is eliminated, so that the contact surface 2f1 presses the key portion 3h. By this, the follower gear 3 starts rotation thereof. Thereafter, the gear portion 3a of the follower gear 3 and the driving gear 1 engage with each other, so that the driving force is transmitted from the driving gear 1 to the follower gear 3. That is, the solenoid 7 is driven, and the trigger gear 2 rotated by the elastic force of a deformable trigger spring 4 so as to engage with the driving gear 1 engages with the follower gear 3 by receiving the drive (driving force) from the driving gear 1, so that the follower gear 3 is made rotatable by the driving force from the driving gear 1.

Then, as shown in parts (a) and (c) of FIG. 7, when the follower gear 3 starts rotation thereof, the intermittent projection 3d as the first arcuate surface of the follower gear 3 slides with the intermittent recess 5b as the second arcuate surface of the intermediary gear 5, so that the follower gear 3 rotates without rotating the intermediary gear 5. This is referred to as a first intermittent operation. When the follower gear 3 rotates in a predetermined amount without rotating the intermediary gear 5, a tooth of the gear portion 3c positioned adjacent to an end portion of the intermittent projection 3d as the first arcuate surface engages with an end portion of the intermittent recess 5b as the second arcuate surface and causes the intermediary gear 5 to start rotation of the intermediary gear 5. By this, the gear portion 3c of the follower gear 3 and the gear portion 5a of the intermediary gear 5 engages with each other, so that the intermediary gear 5 is rotated.

Incidentally, after the trigger gear 2 is rotated by eliminating (releasing) the lock of the locking portion 2a of the trigger gear 2 by the locking claw 7a of the solenoid 7, as shown in part (a) of FIG. 5, energization to the solenoid 7 is stopped. For this reason, the locking claw 7a is moved in a direction toward the trigger gear 2 by a tensile force of the returning spring 7b, so that the locking claw 7a is caused to be put on stand-by at a position where the locking claw 7a is capable of locking the locking portion 2a.

Then, as shown in part (a) of FIG. 8, when the intermediary gear 5 starts rotation thereof, the intermittent projection 5d as the third arcuate surface of the intermediary gear 5 slides with the intermittent recess 6b as the fourth arcuate surface of the output gear 6, so that the intermediary gear 5 rotates without rotating the output gear 6. This is referred to as a second intermittent operation. When the intermediary gear 5 rotates in a predetermined amount without rotating the output gear 6, a tooth of the gear portion 5c positioned adjacent to an end portion of the intermittent projection 5d as the third arcuate surface of the intermediary gear 5 engages with an end portion of the intermittent recess 6b as the fourth arcuate surface of the output gear 6 and causes the output gear 6 to start rotation of the output gear 6. That is, after the intermediary gear 5 is rotated by the follower gear 3 without rotating the output gear 6, the intermediary gear 5 is capable of transmitting the drive (driving force) to the output gear 6.

By this, the gear portion 5c of the intermediary gear 5 and the gear portion 6a of the output gear 6 engage with each other, so that the output gear 6 is rotated. By the start of rotation of the output gear 6, the switching driving gear 106h starts rotation thereof through the rotation shaft 106i drive-connected to the rotation shaft 6c of the output gear 6. Thus, the driving force from the motor 11 is transmitted to the switching driving gear 106h.

Parts (a) to (c) of FIG. 9 show a state in which the driving force from the motor 11 is transmitted to the driving gear 1 and thereafter is transmitted to the switching driving gear 106h through the rotation shaft 106i drive-connected from the driving gear 1 to the rotation shaft 6c of the output gear 6 through the follower gear 3, the intermediary gear 5 and the output gear 6. Further, as shown in part (b) of FIG. 9, during rotation of the follower gear 3 in engagement with the driving gear 1, the cam portion 3e presses the swingable arm 8b of the lever member 8 against the elastic force (elongation force) of the home spring 9, so that the home spring 9 is contracted and thus the elastic force is charged.

Then, as shown in part (a) of FIG. 10, the toothless portion 2c opposes the driving gear 1 immediately before the trigger gear 2 rotates one full turn. Then, the gear portion 2b does not engage with the driving gear 1. For this reason, the trigger gear 2 is prevented from receiving the driving force from the driving gear 1. At this time, as shown in part (b) of FIG. 10, the follower gear 3 still rotates in engagement with the driving gear 1. At this time, the boss 2d of the trigger gear 2 is pressed in a rotational direction which is the counterclockwise direction of part (a) of FIG. 10 by the tensile force of the trigger spring 4 engaged with the boss 3f of the follower gear 3. By this, the trigger gear 2 rotates. Then, at a place where the trigger gear 2 rotates one full turn, the locking portion 2a of the trigger gear 2 is abutted against and locked by the locking claw 7a of the solenoid 7, so that the trigger gear 2 is stopped at the home position.

As shown in parts (a) and (b) of FIG. 11, the trigger gear 2 is locked at the locking portion 2a thereof by the locking claw 7a of the solenoid 7 and is at rest in the home position. Further, as shown in part (b) of FIG. 11, the engagement between the gear portion 5c of the intermediary gear 5 and the gear portion 6a of the output gear 6 is ended, so that the intermittent projection 5d as the third arcuate surface of the intermediary gear 5 and the intermittent recess 6b as the fourth arcuate surface of the output gear 6 oppose each other.

For this reason, the driving force from the intermediary gear 5 is not transmitted and thus rotation of the output gear 6 stops, and thus the output gear 6 is in the home position again. Thus, the output gear 6 rotates one full turn and stops the rotation. By the stop of the output gear 6, the switching driving gear 106h also stops and the output gear 6 is in the home position, and therefore, a rotational position of the switching driving gear 106h is restricted.

Further, in a state shown in FIG. 11, the intermediary gear 5 engages with the follower gear 3. For this reason, the intermittent projection 5d as the third arcuate surface of the intermediary gear 5 slides with the intermittent recess 6b as the fourth arcuate surface of the output gear 6, so that the intermediary gear 5 rotates without rotating the output gear 6. This is referred to as a third intermittent operation. Incidentally, as shown in part (a) of FIG. 11, at the time when the locking portion 2a of the trigger gear 2 is locked by the locking claw 7a of the solenoid 7 and thus the trigger gear 2 is at rest, the state in which there is play between the contact surface 2f1 which is the wall surface of the groove 2f of the trigger gear 2 and the key portion 13h is formed again. By this, the follower gear 3 is capable of rotating in a predetermined amount from the state in which the trigger gear 2 is at rest.

As shown in part (c) of FIG. 12, the engagement between the gear portion 3c of the follower gear 3 and the gear portion 5a of the intermediary gear 5 is ended, the intermittent projection 3d as the first arcuate surface of the follower gear 3 and the intermittent recess 5b as the second arcuate surface of the intermediary gear 5 and the intermittent recess 5b as the second arcuate surface of the intermediary gear 5 oppose each other. For this reason, to the intermediary gear 5, the driving force is not transmitted, so that rotation of the intermediary gear 5 stops and thus the intermediary gear 5 is in the home position again. Thus, the intermediary gear 5 rotates one full turn and stops the rotation. Thereafter, the follower gear 3 is further rotated by receiving the driving force from the driving gear. By this, the intermittent projection 3d as the first arcuate surface of the follower gear 3 slides with the intermittent recess 5b as the second arcuate surface of the intermediary gear 5, so that the follower gear 3 rotates without rotating the intermediary gear 5. This is referred to as a fourth intermittent operation.

Then, as shown in part (c) of FIG. 12, the toothless portion 3b of the follower gear 3 opposes the driving gear 1, so that the gear portion 3a of the follower gear 3 does not engage with the driving gear 1. For this reason, the follower gear cannot receive the driving force from the driving gear 1. At this time, when the rotation of the follower gear 3 stops before the toothless portion 3b of the follower gear 3 completely moves to the position where the toothless portion 3b opposes the driving gear 1, there is a liability that noise is caused by slight collision between the rotating driving gear 1 and a tooth top of the gear portion 3a of the follower gear 3 of which rotation stops. In order to prevent such a matter, there is a need to further rotate the follower gear 3 without relying upon the driving force from the driving gear 1.

Specifically, as shown in part (b) of FIG. 12, during the fourth intermittent operation, the swingable arm 8b of the lever member 8 is pressed by the elastic force (elongation force) of the home spring 9 as the elastic member until contacts the cam portion 3e along the flat surface portion of the cam portion 3e of the follower gear 3. By this, the follower gear 3 rotates to the home position where the toothless portion 3b of the follower gear 3 opposes the driving gear 1 and the engagement between the follower gear 3 and the driving gear 1 is completely released (eliminated) and which is shown in parts (a) and (c) of FIG. 5. By this, with respect to the rotational direction of the follower gear 3, teeth of the gear portion 3a are sufficiently retracted from the driving gear 1.

Further, as shown in part (a) of FIG. 12, in a state in which the rotation of the trigger gear 2 stops, the follower gear 3 rotates. At this time, the key portion 3h of the follower gear 3 moves in the groove 2f of the trigger gear 2. During the movement, the boss 3f of the follower gear 3 moves away from the boss 2d of the trigger gear 2 against the tensile force of the trigger spring 4. For this reason, the trigger spring 4 elongates, so that the elastic force is charged.

Incidentally, before timing when the gear portion 3a of the follower gear 3 does not engage with the driving gear, the intermittent projection 3d as the first arcuate surface of the follower gear 3 and the intermittent recess 5b as the second arcuate surface of the intermediary gear 5 oppose each other. Then, the intermittent projection 3d as the first arcuate surface of the follower gear 3 slides with the intermittent recess 5b as the second arcuate surface of the intermediary gear 5. Further, an operation is performed so that the follower gear 3 is rotated by the elastic force (elongation force) of the home spring 9 after a start of the sliding of the intermittent projection 3d as the first arcuate surface of the follower gear 3 with the intermittent recess 5b as the second arcuate surface of the intermediary gear 5.

Thereafter, as shown in part (a) of FIG. 6, when the lock of the locking portion 2a of the trigger gear 2 by the locking claw 7a is released by energizing the solenoid 7 again, the trigger gear 2 is rotated, so that the above-described drive transmission operation is carried out. Thus, in the clutch device CL1, when the follower gear 3 is in the home position, the solenoid 7 is energized with predetermined timing. By this, the driving force of the driving gear 1 is transmitted to the output gear 6, so that the switching driving gear 106h is rotated one full turn, and thus the switching cam 106f can be rotated ½ turn through the switching gear portion 106g shown in FIG. 2.

Thus, according to this embodiment, the clutch device CL1 performs four intermittent operations consisting of the first intermittent operation, the second intermittent operation, the third intermittent operation and the fourth intermittent operation which are described above, in a process in which the drive transmission and drive disconnection are switched. Further, during a period in which the follower gear 3 cannot obtain the driving force from the driving gear 1 and is rotated only by the elastic force (elongation force) of the home spring 9, the follower gear 3 is in a rotatable state without rotating the output gear 6 and the intermediary gear 5.

That is, during the fourth intermittent operation from an end of the engagement between the follower gear 3 and the intermediary gear 5 until the follower gear 3 stops in the home position, the output gear 6 and the intermediary gear 5 are at rest. At this time, the follower gear 3 is rotatable without rotating a subsequent driving train by transmitting the driving force thereto. For this reason, the elastic force (elongation force) of the home spring 9 rotating the follower gear 3 through the swingable arm 8b and the cam portion 3e when the follower gear 3 cannot obtain the driving force from the driving gear 1 may only be a degree such that the elastic force exceeds a force for rotating the follower gear 3 in a predetermined amount against the tensile force (elastic force) of the trigger spring 4.

In this embodiment, during rotation of the follower gear 3 through the swingable arm 8b and the cam portion 3e by the elastic force (elongation force) of the home spring 9 as the elastic member, the follower gear 3 rotates without rotating the intermediary gear 5. For this reason, when the constitution of this embodiment is employed, the elastic force of the home spring 9 as the elastic member for rotating the follower gear 3 through the swingable arm 8b and the cam portion 3e can be made small compared with the elastic force of the elastic member in the case where all the members from the follower gear to the driven member rotate.

Further, in this embodiment, in order to restrict the rotation of the output gear 6, as a dedicated member other than the driving train, there is no need to provide a reverse rotation preventing lever and a lever spring. Further, in a constitution in which the reverse rotation preventing lever is provided, the reverse rotation preventing lever reciprocates about a rotation shaft and is urged against the output gear by the lever spring which is an elastic member, so that an operation noise is caused between the reverse rotation preventing lever and the output gear. In this regards, in this embodiment, the reverse rotation preventing lever is not needed, and therefore, the drive transmission device can be reduced in noise without causing the operation noise caused between the reverse rotation preventing lever and the output gear.

In the case where the reverse rotation preventing lever was used, there was a problem that a reverse rotation preventing function for the output gear by the reverse rotation preventing lever did not act on the output gear unless an intermittent operation of members positioned upstream of the output gear is ended, and in addition, there was a problem that a reverse input torque generating from the other side (direction) cannot shut off by the reverse rotation preventing lever.

On the other hand, in this embodiment, as shown in part (a) of FIG. 12, during a period in which simultaneously with the end of the rotation operation, the intermittent projection 5d as the third arcuate surface of the intermediary gear 5 contacts the intermittent recess 6b as the fourth arcuate surface of the output gear 6 and thus the intermediary gear 5 is at rest, a constitution in which the rotation of the output gear 6 is restricted was employed. By this, the reverse input torque from the contact and separation mechanism 12 for the secondary transfer roller 111 as the driven member can be shut off irrespective of the rotational direction. At this time, the intermediary gear 5 is capable of shutting off the reverse input torques from both directions with respect to the rotational direction of the output gear 6.

That is, in this embodiment, the reverse input torque from the contact and separation mechanism 12 can be shut off by the intermediary gear 5 which is the member in the driving train, and therefore, there is no need to separately provide the dedicated member such as the reverse rotation preventing lever and the lever spring, so that the number of component parts can be reduced. Further, there is no operation noise of the reverse rotation preventing lever, and therefore, the generation of the operation noise can be reduced correspondingly. Further, the operation of the intermediary gear 5 for shutting off the reverse input torque from the contact and separation mechanism 12 is rotation, and the elastic member is not used in the rotation operation of the intermediary gear 5, and therefore, the operation noise does not readily generate.

A length of an arrow shown in FIG. 13 by a solid line represents a time in which an associated gear rotates. A region of the toothless portion 2c shown on a left-hand side of FIG. 13 along an upper arrow of FIG. 13 is a region where in a state in which the toothless portion 2c of the trigger gear 2 opposes the driving gear 1, the trigger gear 2 is rotated by the tensile force of the trigger spring 4. This region means that the region is not a region where the gear portion 2b of the trigger gear 2 is engaged with and driven by the driving gear 1.

On the other hand, a region of the toothless portion 3b shown on a right-hand side of FIG. 13 along the upper arrow of FIG. 13 will be considered. In a state in which the toothless portion 3b of the follower gear 3 opposes the driving gear 1, until the follower gear 3 restores to the home position, the gear portion 3a of the follower gear 3 cannot engage with the driving gear 1. For this reason, a region where the swingable arm 8b of the lever member 8 presses the cam portion 3e of the follower gear 3 by the elastic force (elongation force) of the home spring 9 and thus the follower gear 3 is rotated to the home position is the region of the toothless portion 3b shown on the right-hand side of FIG. 13. In the region of the toothless portion 3b of the fourth intermittent operation of the follower gear 3, a driving operation other than an operation for driving the follower gear 3 by the driving gear 1 is performed.

Thus, the fourth intermittent operation of the follower gear 3 includes the drive by the driving gear 1 and drive when the swingable arm 8b of the lever member 8 processes the cam portion 3e of the follower gear 3 by the elastic force (elongation force) of the home spring 9 and thus the follower gear 3 is rotated to the home position. Here, by the elastic force (elongation force) of the home spring 9 in the fourth intermittent operation of the follower gear 3, the swingable arm 8b of the lever member 8 presses the cam portion 3e of the follower gear 3, so that the follower gear 3 is rotated to the home position. A start of the drive of the follower gear 3 in that case may also be the same time as an end of the drive by the driving gear 1.

A starting point of an arrow shown in FIG. 13 when the home spring 9 rotates the follower gear 3 through the swingable arm 8b and the cam portion 3e will be considered. The starting point of the arrow at this time is an example in the case where the swingable arm 8b of the lever member 8 presses the cam portion 3e of the follower gear 3 by the elastic force (elongation force) of the home spring 9 from during the drive of the follower gear 3 by the driving gear 1 in the fourth intermittent operation and thus the drive of the follower gear 3 by the home spring 9 is started.

Ranges R1 and R3 shown in FIG. 13 are ranged in which a torque on a downstream drive side of the output gear 6 is shut off relative to the follower gear 3. Further, a range R2 is a range in which the torque of the follower gear 3 is transmitted to the downstream drive side of the output gear 6. This range R2 is a range in which the torque of the driving gear 1 is actually transmitted to the output gear 6.

As shown in FIG. 13, a state during the fourth intermittent operation in which the toothless portion 3b of the follower gear 3 is rotated through the swingable arm 8b and the cam portion 3e by the elastic force (elongation force) of the home spring 9 will be considered. In this case, as shown in part (b) of FIG. 12, in a period in which the intermediary gear 5 is at rest, the intermittent projection 5d and the intermittent recess 6b are in contact with each other, so that the rotation of the output gear 6 is restricted. At this time, the intermittent projection 5d as the third arcuate surface provided on the intermediary gear 5 and the intermittent recess 6b as the fourth arcuate surface provided on the output gear 6 are arcuate surfaces concentric with the rotation center of the intermediary gear 5. Further, in the period in which the intermediary gear 5 is at rest, the intermittent projection 5d and the intermittent recess 6b which are the arcuate surfaces contact each other, so that the rotation of the output gear 6 is restricted.

For this reason, a reverse input torque transmitted to the output gear 6 through the switching driving gear 106h from the contact and separation mechanism 12 for the secondary transfer roller 111 as the driven member is shut off irrespective of the rotational direction in which the torque acts on the output gear 6. For this reason, the reverse input torque is transmitted from the output gear 6 to the intermediary gear 5 in some instances, but is not transmitted to the follower gear 3. By this, the reverse input torque acting on the output gear 6 is not transmitted to the follower gear 3 irrespective of the rotational direction in which the reverse input torque acts on the output gear 6, and is thus shut off.

That is, as shown in FIG. 13, the swingable arm 8b presses the can portion 3e by the elastic force (elongation force) of the home spring 9 as the elastic member, so that the follower gear 3 is rotated. At this time, the intermittent projection 3d slides with the intermittent recess 5b of the intermediary gear 5 which is at rest, so that the follower gear 3 rotates without rotating the intermediary gear 5. Further, when the follower gear 3 rotates in a predetermined amount without rotating the intermediary gear 5, a tooth of the gear portion 3c positioned adjacent to the intermittent projection 3d engages with an end portion of the intermittent recess 5b, and causes the intermediary gear 5 to start rotation. Thereafter, the gear portion 3c of the follower gear 3 and the gear portion 5a of the intermediary gear 5 engage with each other, so that the intermediary gear 5 is rotated.

The intermittent projection 5d slides with the intermittent recess 6b of the output gear 6 which is at rest, so that the intermediary gear 5 rotates without rotating the output gear 6. Thereafter, the intermittent recess 6b contacts the intermittent projection 5d of the intermediary gear 5 which is at rest, so that rotation of the output gear 6 is restricted. Further, the intermittent projection 3d slides with the intermittent recess 5b of the intermediary gear 5 which is at rest, so that the follower gear 3 rotates without rotating the intermediary gear 5. In FIG. 13, when the swingable arm 8b presses the cam portion 3e by the elastic force (elongation force) of the home spring 9 and thus the follower gear 3 is rotated, the intermediary gear 5 is not rotated. Further, after the rotation of the output gear is ended, the intermediary gear 5 continues rotation by the third intermittent operation, and after the rotation of the intermediary gear 5 is ended, the follower gear 3 continues rotation by the fourth intermittent operation.

In the range R2 of FIG. 13, when the follower gear 3 rotates in engagement with the driving gear 1, the follower gear 3 rotates the intermediary gear 5 and the intermediary gear 5 rotates the output gear 6. By this, the elastic force (elongation force) does not relates to a magnitude of a rotational torque of the output gear 6, and therefore, there is no need to change the elastic force of the home spring 9 depending on the rotational torque of the output gear 6. Further, there is need to provide a dedicated member for shutting off the reverse input torque from the output gear 6 toward the follower gear 3 or the like torque.

As a result, as the home spring 9, an inexpensive home spring with a small elastic force can be used, and correspondingly, it is possible to avoid increases in size and cost. Further, as regards the follower gear 3 itself, there is no need that a portion for supporting the home spring 9 and the locking claw 7a for locking the trigger gear 2 interrelating with the follower gear 3 is not required to be formed of a material and in shape enough to withstand a large elastic force, and correspondingly, it is possible to avoid the increases in size and cost.

Further, noise generating due to collision of the swingable arm 8b with the cam portion 3e of the follower gear 3 when the home spring 9 presses the cam portion 3e of the follower gear 3 through the swingable arm 8b can be made small correspondingly to a small elastic force of the home spring 9. Further, when a constitution in which the drive transmission device is assembled against the elastic force of the home spring 9 is employed, correspondingly to the small elastic force of the home spring 9, an assembling property and operativity are not readily impaired.

Further, the pressing (urging) force of the home spring 9 when the home spring 9 rotates the follower gear 3 in the state in which the driving gear 1 and the follower gear 3 are engaged with each other constitutes a rotational resistance when the home spring 9 rotates the follower gear 3 through the swingable arm 8b and the cam portion 3e. However, correspondingly to the small elastic force of the home spring 9, the rotational resistance when the follower gear 3 is rotated by the pressing force of the home spring 9 through the swingable arm 8b and the cam portion 3e. For this reason, correspondingly to the small elastic force, the driving force needed for the motor 11 as the driving source for rotating the follower gear 3 can be lowered. Accordingly, an inexpensive and small-sized driving source with low output can be used.

Further, in the case where the output gear 6 is in the home position, even when the driving train on the downstream drive side of the output gear 6 is liable to be rotated by an external force or the like, a rotational position of the switching cam 106f is restricted. For this reason, there is no need to provide another member for the purpose such that the switching cam 106f is prevented from being rotated by the external force or the like.

Modified Embodiment

Incidentally, the constitution of this embodiment can be modified in the following manner. A state in which the intermittent projection 3d as the first arcuate surface of the follower gear 3 and the intermittent recess 5b as the second arcuate surface of the intermediary gear 5 oppose each other will be considered. Further, a state in which the intermittent projection 5d as the third arcuate surface of the intermediary gear 5 and the intermittent recess 6b as the fourth arcuate surface of the output gear 6 oppose each other will be considered. In these states, when the rotation of the intermediary gear 5 and the output gear 6 is restricted in a predetermined amount, a gap may also be formed between the respective opposing arcuate surfaces.

Further, in this embodiment, the constitution in which the follower gear 3, the intermediary gear 5 and the output gear 6 are rotated about shafts different from each other was employed, but the follower gear 3 may also be formed on the same rotation shaft as the follower gear 3. That is, in the driving train from the motor 11 to the switching cam 106f, the intermediary gear 5 having the intermittent recess 5b as the second arcuate surface and the intermittent recess 6d as the third arcuate surface may only be required to be positioned on the downstream drive side of the follower gear 3 and on the upstream drive side of the output gear 6. Similarly, there is no need that the switching driving gear 106h is also not concentric (coaxial) with the output gear 6, but the switching driving gear 106h may only be required to be positioned on the downstream drive side of the output gear 6.

Further, the clutch device CL1 of this embodiment is, as shown in FIGS. 1 and 2, used for driving the contact and separation mechanism 12 as the driven member for the driving roller 106a opposing the secondary transfer roller 111 through the belt 106. As the driven member to be driven by the rotation of the output gear 6, the present invention is also applicable to a mechanism other than this mechanism. For example, as the driven member to be driven by the rotation of the output gear 6, the present invention is also applicable to an intermittent rotating mechanism for the feeding roller 108 shown in FIG. 1 and a pressure-releasing mechanism provided between the fixing roller 113a and the pressing roller 113b in the fixing device 113.

Further, as shown in FIG. 1, when the image forming apparatus 100 of an in-line type including the plurality of photosensitive drums 102 is used, as the driven member to be driven by the rotation of the output gear 6, the present invention is also applicable to a contact and separation mechanism for each of the primary transfer rollers 106d. Further, as the driven member to be driven by the rotation of the output gear 6, the present invention is also applicable to a contact and separation mechanism provided between the developing roller 104 of the developing device 10 and the photosensitive drum 102.

The present invention is also applicable to a mechanism for switching ON/OFF of transmission of the driving force from the driving source to these contact and separation mechanisms. According to this embodiment, the elastic force of the home spring 9 necessary to rotate the follower gear 3 through the swingable arm 8b and the cam portion 3e can be reduced without being proportional to a magnitude of a driving torque on the driven member side where the follower gear 3 transmits the driving force (drive).

Second Embodiment

Then, a constitution of a second embodiment of the image forming apparatus including the drive transmission device according to the present invention will be described with reference to FIGS. 14 to 18. Incidentally, members (portions) constituted similarly as in the first embodiment are represented by the same reference numerals or symbols or by adding the same member (portion) means even when the reference numerals or symbols are different, and will be omitted from description.

<Clutch Device>

A structure of a clutch device CL2 as the drive transmission device of this embodiment will be described using FIGS. 14 and 15. FIG. 14 is a perspective view showing the structure of the clutch device CL2 of this embodiment. FIG. 15 is a perspective view showing a structure of a follower gear 3 provided in the clutch device CL2. The clutch device CL2 shown in FIG. 14 is only partly different from the clutch device CL1 of the first embodiment in shape of the follower gear 3 provided in the clutch device CL1, and constitutions other than the follower gear 3 are similar to those of the clutch device CL1 and therefore will be omitted from redundant description.

The follower gear 3 provided in the clutch device CL2 includes, as shown in FIG. 15, a projected-shaped intermittent projection $3d$ which is a first arcuate surface with the same radius as a pitch (circle) diameter of the gear portion $3c$ at a part of the gear portion $3c$ of the follower gear 3. The gear portion $3c$ includes a teeth number diameter corresponding to 36 teeth, and the intermittent projection $3d$ as the first arcuate surface is constituted by a projected arcuate shape corresponding to 5 teeth of the gear portion $3c$. At a part of the intermittent projection $3d$ as the first arcuate surface of the follower gear 3 in this embodiment, a recessed portion $3i$ which is recessed more than the first arcuate surface is provided. The recessed portion $3i$ is provided at a position adjacent to one end portion $3d1$ of the intermittent projection $3d$ as the first arcuate surface.

<Operation of Clutch Device CL2>

Next, a drive transmission operation of the clutch device CL2 of this embodiment will be described using FIGS. 16 to 18. FIGS. 16 to 18 are front views for illustrating the operation of the clutch device CL2 of this embodiment. FIG. 16 shows a state of the clutch device CL2 immediately before an end of rotation of the intermediary gear 5. FIG. 17 shows a state of the clutch device CL2 at the time of a start of a fourth intermittent operation. FIG. 18 shows a state of the clutch device CL2 in which the follower gear 3 is in a home position.

As shown in FIG. 16, the gear portion $3a$ of the follower gear 3 rotates in engagement with the driving gear 1, and by the rotation of the follower gear 3, one end portion $3d1$ of the intermittent projection $3d$ as the first arcuate surface contacts the intermittent recess $5b$ as the second arcuate surface of the intermediary gear 5 and thus rotates the intermediary gear 5. The intermittent projection $3d$ as the first arcuate surface of the follower gear 3 is going to oppose the intermittent recess $5b$ as the second arcuate surface of the intermediary gear 5, so that the intermediary gear 5 is in a state immediately before the intermediary gear 5 is in the home position and ends the rotation thereof.

Then, as shown in FIG. 17, when the follower gear 3 is further rotated by the driving gear 1, a fourth intermittent operation in which the intermittent projection $3d$ as the first arcuate surface of the follower gear 3 slides with the intermittent recess $5b$ as the second arcuate surface of the intermediary gear 5 is performed. In this fourth intermittent operation, the recessed portion $3i$ provided as a part of the intermittent projection $3d$ as the first arcuate surface of the follower gear 3 does not contact the intermittent recess $4b$ as the second arcuate surface of the intermediary gear 5, and the follower gear 3 rotates. Further, an intermittent projection $3d2$ as an upstream-side first arcuate surface of the follower gear with respect to a rotational direction of the follower gear 3 slides with the intermittent recess $5b$ as the second arcuate surface of the intermediary gear 5. By this, the intermediary gear 5 is disposed in the home position, so that the rotation of the intermediary gear 5 stops.

The follower gear 3 shown in FIG. 18 is in a state in which the toothless portion $3b$ thereof is rotated to the home position opposing the driving gear 1 and is at rest. In this state, the recessed portion $3i$ provided at a part of the intermittent projection $3d$ as the first arcuate surface of the follower gear 3 is in a position opposing an upstream-side one end portion $5b1$ of the intermittent recess $5b$ as the second arcuate surface of the intermediary gear 5 with respect to the rotational direction of the intermediary gear 5. For that reason, the recessed portion $3i$ of the follower gear 3 and the intermittent recess $5b$ as the second arcuate surface of the intermediary gear 5 are in a non-contact state.

That is, as shown in FIG. 18, the case where the follower gear 3 is in a phase such that the follower gear 3 does not rotate the intermediary gear 5 will be considered. In this case, the intermittent projection $3d$ as the first arcuate surface of the follower gear 3 is provided with the recessed portion $3i$ as a non-contact portion where the intermittent projection $3d$ does not contact the intermittent recess $5b$ as the second arcuate surface of the intermediary gear 5.

As shown in FIG. 18, the case where the follower gear 3 is in the home position will be considered. In this case, the recessed portion $3i$ provided at a part of the intermittent projection $3d$ as the first arcuate surface of the follower gear 3 is in the position opposing the upstream one end portion $5b1$ of the intermittent recess $5b$ as the second arcuate surface of the intermediary gear 5 with respect to the rotational direction of the intermediary gear 5. Further, the recessed portion $3i$ of the follower gear 3 and the intermittent recess $5b$ as the second arcuate surface of the intermediary gear 5 are in a non-contact state.

For this reason, the case where the follower gear 3 is rotated by the elastic force (elongation force) of the home spring 9 through an unshown cam portion $3e$ and the swingable arm $8b$ shown in FIG. 14 and thus is in the home position will be considered. In this case, a portion where the follower gear 3 most easily contacts the intermediary gear 5 by the influence of a reaction force of a torque for rotating the intermediary gear 5 is eliminated, and therefore, a sliding resistance can be made small.

Further, as shown in FIG. 18, the case where when the follower gear 3 is in the home position, the recessed portion $3i$ provided at the part of the intermittent projection $3d$ as the first arcuate surface of the follower gear 3 and the intermittent recess $5b$ as the second arcuate surface of the intermediary gear 5 are in the non-contact state will be considered. Even in this state, as regards the output gear 6 shown in FIG. 14, rotation thereof is restricted by the intermediary gear 5 which is at rest similarly in the case described with reference to part (b) of FIG. 5.

The intermediary gear 5 is not in a state in which the driving force is transmitted from the follower gear 3, and the intermittent projection $3d$ as the first arcuate surface of the follower gear 3 opposes the intermittent recess $5b$ as the second arcuate surface of the intermediary gear 5. For this reason, the intermediary gear 5 does not rotate freely. For this reason, the recessed portion $3i$ provided at the part of the intermittent projection $3d$ as the first arcuate surface of the follower gear 3 and the upstream-side one end portion $5b1$ of the intermittent recess $5b$ as the second arcuate surface of the intermediary gear 5 with respect to the rotational of the intermediary gear 5 do not contact each other.

By such a constitution, when the follower gear 3 is rotated by the elastic force (elongation force) of the home spring 9 through the unshown cam portion $3e$ and the swingable arm 8b shown in FIG. 14, a degree of the influence of the sliding resistance of the follower gear 3 with the intermediary gear 5 can be reduced. For this reason, compared with the above-described first embodiment, the urging force of the home spring 9 can be further reduced. Further, the sliding resistance of the follower gear 3 with the intermediary gear 5 is decreased, so that it is possible to reduce a degree of variation in home position of the follower gear 3 and thus accuracy and reliability of the home position of the follower gear 3 are improved. Other constitutions are similar to those of the first embodiment, and an effect similar to the effect of the first embodiment can be achieved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-125897 filed on Jul. 5, 2019, which is hereby incorporated by reference herein in its entirety.

What is claimed is:

1. A drive transmission device comprising:
   a driving gear to which a driving force is inputted from a driving source;
   a follower gear rotatable by said driving gear;
   an intermediary gear rotatable by said follower gear;
   an output gear rotatable by said intermediary gear and configured to transmit the driving force to a driven member; and
   an elastic member configured to move said follower gear from a state in which said follower gear is not rotated by said driving gear to a state in which said follower gear is rotated by said driving gear,
   wherein transmission of the driving force from said driving gear to said follower gear and transmission of the driving force from said intermediary gear to said output gear are disabled, in a non-transmission state, and
   wherein in a transmission state,
   (i) said follower gear is moved by an elastic force of said elastic member to enable rotation of said follower gear by the driving force from said driving gear, and thereafter,
   (ii) said intermediary gear is rotated by the follower gear without rotating said output gear, and thereafter, said intermediary gear is enabled to transmit the driving force to said output gear.

2. A drive transmission device according to claim 1, wherein when said follower gear rotates in engagement with said driving gear, said follower gear rotates said intermediary gear and said intermediary gear rotates said output gear.

3. A drive transmission device according to claim 1, wherein said follower gear, said intermediary gear and said output gear are gears engageable with each other,
   wherein when said follower gear is in a phase where said follower gear does not rotate said intermediary gear, at an opposing portion between said follower gear and said intermediary gear, a tooth of said follower gear and a tooth of said intermediary gear are in non-engagement with each other, and
   wherein when said intermediary gear is in a phase where said intermediary gear does not rotate said output gear, at an opposing portion between said intermediary gear and said output gear, a tooth of said intermediary gear and a tooth of said output gear are non-engagement with each other.

4. A drive transmission device according to claim 1, wherein said follower gear includes a first arcuate surface, said intermediary gear includes a second arcuate surface and a third arcuate surface, and said output gear includes a fourth arcuate surface,
   wherein the first arcuate surface is provided concentrically with a rotation center of said follower gear, and the third arcuate surface is provided concentrically with a rotation center of said intermediary gear, and
   wherein when said follower gear is in a phase where said follower gear does not rotate said intermediary gear, the first arcuate surface is located at a portion of said follower gear opposing said intermediary gear, and the second arcuate surface is located at a portion of said intermediary gear opposing said follower gear such that the second arcuate surface extends along said first arcuate surface,
   wherein when said intermediary gear is in a phase where said intermediary gear does not rotate said output gear, the third arcuate surface is located at a portion of said intermediary gear opposing said output gear, and the fourth arcuate surface is located at a portion of said output gear opposing said intermediary gear such that the fourth arcuate surface extends along said third arcuate surface.

5. A drive transmission device according to claim 4, wherein when said follower gear is in a phase where said follower gear does not rotates said intermediary gear, said first arcuate surface includes a non-contact portion which is in non-contact with said second arcuate surface.

6. A drive transmission device according to claim 1, wherein said driving gear and said follower gear are gears engageable with each other, and
   wherein said follower gear includes a toothless portion free from a tooth engageable with said driving gear.

7. A drive transmission device according to claim 1, further comprising engaging portion engageable with said driving gear,
   wherein said engaging portion engages with said follower gear and said engaging portion is movable, by being moved relative to said follower gear, between a position where said engaging portion engages with said driving gear and a position where said engaging portion does not engage with said driving gear.

8. A drive transmission device according to claim 7, wherein said engaging portion is urged from the position where said engaging portion does not engage with said driving gear toward the position where said engaging portion engages with said driving gear.

9. An image forming apparatus comprising:
   an image bearing member;
   a belt onto which a toner image borne on said image bearing member is primary-transferred;
   a secondary transfer roller onto which the toner image transferred on said belt is secondary-transferred;
   a contact and separation mechanism which is said driven member and which causes said secondary transfer roller to contact said belt and to separate from said belt, and
   a drive transmission device according to claim 1,
   wherein said output gear is connected to said contact and separation mechanism, and thus the driving force is transmitted.

10. A drive transmission device comprising:
    a driving gear to which a driving force is inputted from a driving source;
    a follower gear rotatable by said driving gear;

an intermediary gear rotatable by said follower gear;

an output gear rotatable by said intermediary gear and configured to transmit the driving force to a driven member; and an elastic member configured to move said follower gear in a state in which said follower gear is not rotated by said driving gear, wherein said follower gear is moved by an elastic force of said elastic member in a state where said output gear is not rotated by said intermediary gear, and said intermediary gear is not rotated by the follower gear.

11. A drive transmission device according to claim 10, wherein when said follower gear rotates in engagement with said driving gear, said follower gear rotates said intermediary gear and said intermediary gear rotates said output gear.

12. A drive transmission device according to claim 10, wherein said follower gear, said intermediary gear and said output gear are gears engageable with each other, wherein when said follower gear is in a phase where said follower gear does not rotate said intermediary gear, at an opposing portion between said follower gear and said intermediary gear, a tooth of said follower gear and a tooth of said intermediary gear are in non-engagement with each other, and wherein when said intermediary gear is in a phase where said intermediary gear does not rotate said output gear, at an opposing portion between said intermediary gear and said output gear, a tooth of said intermediary gear and a tooth of said output gear are non-engagement with each other.

13. A drive transmission device according to claim 10, wherein said follower gear includes a first arcuate surface, said intermediary gear includes a second arcuate surface and a third arcuate surface, and said output gear includes a fourth arcuate surface, wherein the first arcuate surface is provided concentrically with a rotation center of said follower gear, and the third arcuate surface is provided concentrically with a rotation center of said intermediary gear, and wherein when said follower gear is in a phase where said follower gear does not rotate said intermediary gear, the first arcuate surface is located at a portion of said follower gear opposing said intermediary gear, and the second arcuate surface is located at a portion of said intermediary gear opposing said follower gear such that the second arcuate surface extends along said first arcuate surface, wherein when said intermediary gear is in a phase where said intermediary gear does not rotate said output gear, the third arcuate surface is located at a portion of said intermediary gear opposing said output gear, and the fourth arcuate surface is located at a portion of said output gear opposing said intermediary gear such that the fourth arcuate surface extends along said third arcuate surface.

14. A drive transmission device according to claim 13, wherein when said follower gear is in a phase where said follower gear does not rotates said intermediary gear, said first arcuate surface includes a non-contact portion which is in non-contact with said second arcuate surface.

15. A drive transmission device according to claim 10, wherein said driving gear and said follower gear are gears engageable with each other, and wherein said follower gear includes a toothless portion free from a tooth engageable with said driving gear.

16. A drive transmission device according to claim 10, further comprising: an engaging portion engageable with said driving gear, and wherein said engaging portion engages with said follower gear and said engaging portion is movable, by being moved relative to said follower gear, between a position where said engaging portion engages with said driving gear and a position where said engaging portion does not engage with said driving gear.

17. A drive transmission device according to claim 16, wherein said engaging portion is urged from the position where said engaging portion does not engage with said driving gear toward the position where said engaging portion engages with said driving gear.

18. An image forming apparatus comprising:

an image bearing member;

a belt onto which a toner image borne on said image bearing member is primary-transferred;

a secondary transfer roller onto which the toner image transferred on said belt is secondary-transferred;

a contact and separation mechanism which is said driven member and which causes said secondary transfer roller to contact said belt and to separate from said belt, and a drive transmission device according to claim 10, wherein said output gear is connected to said contact and separation mechanism, and thus the driving force is transmitted.

* * * * *